(12) United States Patent
Nicolas et al.

(10) Patent No.: US 9,982,832 B1
(45) Date of Patent: May 29, 2018

(54) ANGULARLY ADJUSTABLE HOUSING MOUNT ASSEMBLY

(71) Applicant: Bosch Security Systems, Inc., Fairport, NY (US)

(72) Inventors: Edgar Nicolas, St. Cloud, MN (US); Darin Stephenson, Montrose, MN (US)

(73) Assignees: Bosch Security Systems Inc., Fairport, NY (US); Robert Bosch GmbH, Stuttgart (DE)

( * ) Notice: Subject to any disclaimer, the term of this patent is extended or adjusted under 35 U.S.C. 154(b) by 0 days. days.

(21) Appl. No.: 15/605,496

(22) Filed: May 25, 2017

(51) Int. Cl.
| | |
|---|---|
| *F16M 11/10* | (2006.01) |
| *F16M 11/20* | (2006.01) |
| *F16M 13/02* | (2006.01) |
| *H04R 1/02* | (2006.01) |
| *F16M 13/00* | (2006.01) |
| *F16M 11/00* | (2006.01) |

(52) U.S. Cl.
CPC ......... *F16M 11/10* (2013.01); *F16M 11/2014* (2013.01); *F16M 13/02* (2013.01); *H04R 1/026* (2013.01); *F16M 11/00* (2013.01); *F16M 13/00* (2013.01)

(58) Field of Classification Search
CPC .... F16M 11/10; F16M 11/2014; F16M 11/00; F16M 13/00; F16M 13/02; H04R 1/026
USPC ...................................................... 248/278.1
See application file for complete search history.

(56) References Cited

U.S. PATENT DOCUMENTS

| | | | | |
|---|---|---|---|---|
| 3,911,221 A | * | 10/1975 | Wong ................... | F16C 11/0619 |
| | | | | 381/386 |
| 5,704,578 A | | 1/1998 | Fischer | |
| 5,790,910 A | * | 8/1998 | Haskin ................... | F16M 11/14 |
| | | | | 248/181.1 |
| 6,347,776 B1 | | 2/2002 | Chuang | |
| D471,433 S | | 3/2003 | Vogels | |
| 6,685,150 B2 | | 2/2004 | Anderson | |
| 7,281,867 B2 | * | 10/2007 | Takahashi .............. | F16M 13/02 |
| | | | | 348/143 |
| 7,455,271 B2 | * | 11/2008 | Pincek ................... | F16M 11/14 |
| | | | | 248/220.21 |
| 7,523,906 B2 | | 4/2009 | Bennett | |
| 7,658,554 B2 | * | 2/2010 | Takahashi .............. | F16M 11/10 |
| | | | | 348/143 |
| 8,231,403 B2 | | 7/2012 | Smith | |

(Continued)

OTHER PUBLICATIONS

Monoprice Speaker Wall Mounting Bracket jpeg found by the inventor on the internet on Jul. 29, 2016.

*Primary Examiner* — Anita M King
(74) *Attorney, Agent, or Firm* — Kelly McGlashen; Maginot Moore & Beck LLP

(57) ABSTRACT

A bracket assembly is used to secure a housing to a support structure such as a post, wall or ceiling. The bracket assembly includes an inner bracket, an outer bracket and a connector. The inner bracket is configured to be mounted on the support structure separately from the outer bracket, and the outer bracket is configured to be quickly mounted on the inner bracket. The outer bracket and connector are joined by a ball and socket joint. Angular adjustment of the ball relative to the socket is made prior to mounting of the outer bracket on the inner bracket, and the desired orientation is maintained using a clamping assembly. The bracket assembly includes sealing features that prevent moisture from entering the assembly.

19 Claims, 11 Drawing Sheets

(56) References Cited

U.S. PATENT DOCUMENTS

| | | |
|---|---|---|
| 8,311,262 B2 | 11/2012 | Kulchy et al. |
| 8,837,767 B2 | 9/2014 | Stewart et al. |
| 8,948,436 B2 | 2/2015 | Stewart, Jr. et al. |
| 9,016,645 B2 * | 4/2015 | Simpson ................ F16M 13/02 248/278.1 |
| 2003/0174855 A1 | 9/2003 | Hawkins et al. |
| 2005/0100187 A1 | 5/2005 | Yang |
| 2017/0188123 A1 * | 6/2017 | Wright .................. H04R 1/026 |

* cited by examiner

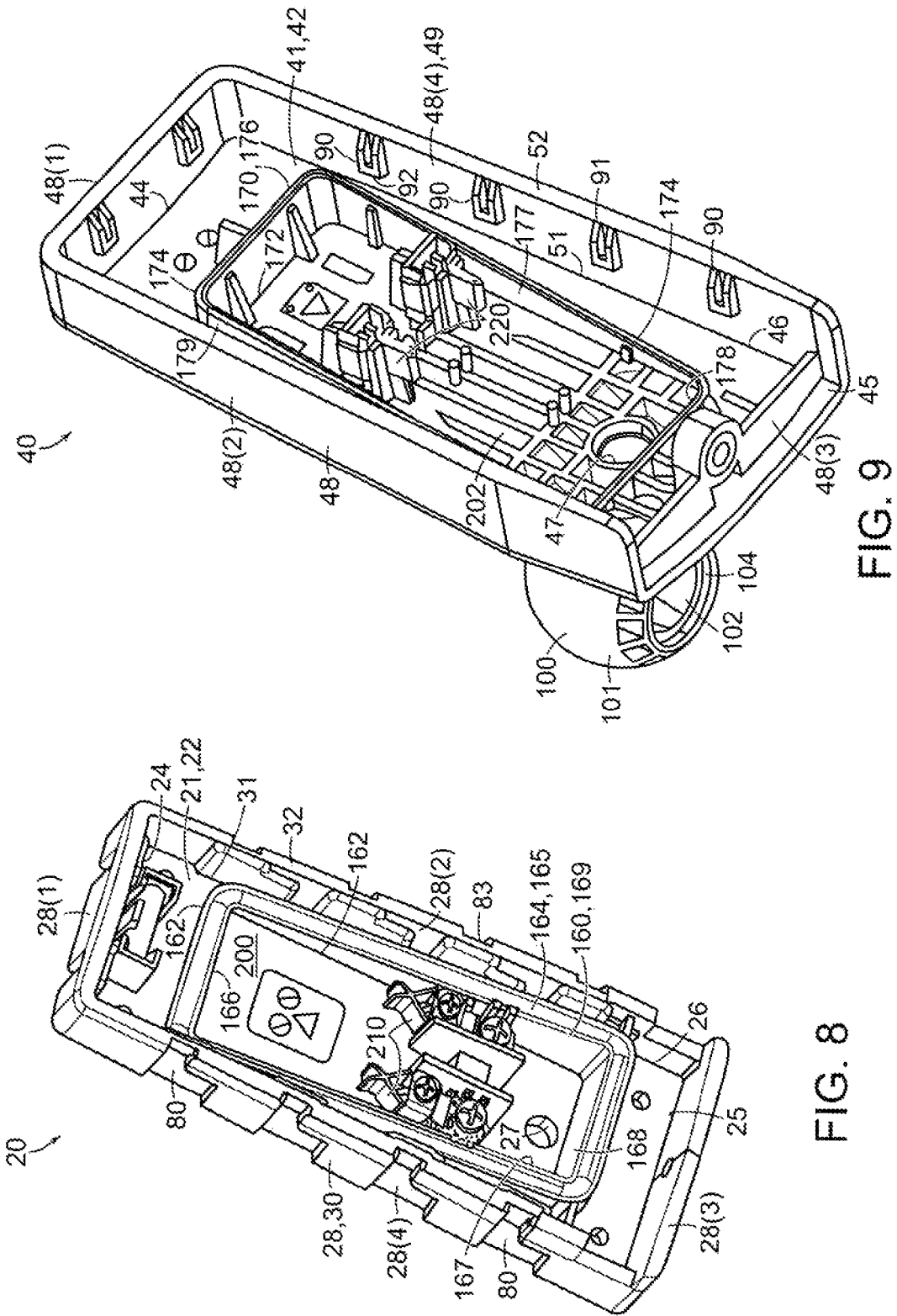

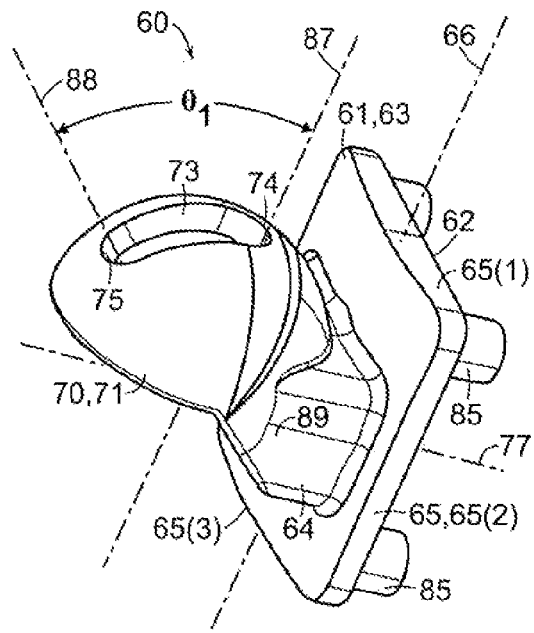
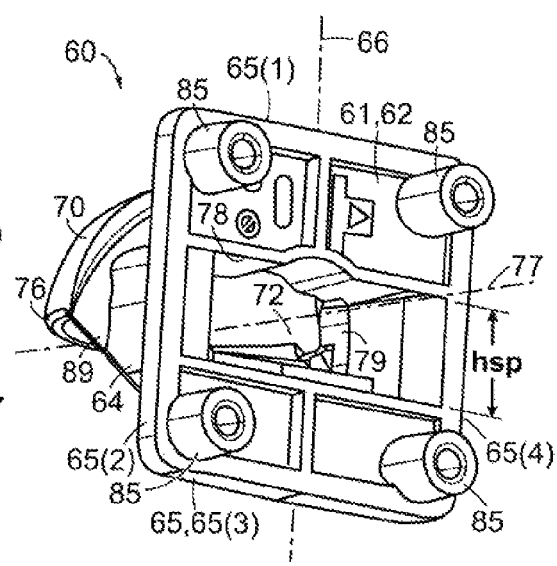
FIG. 12     FIG. 13
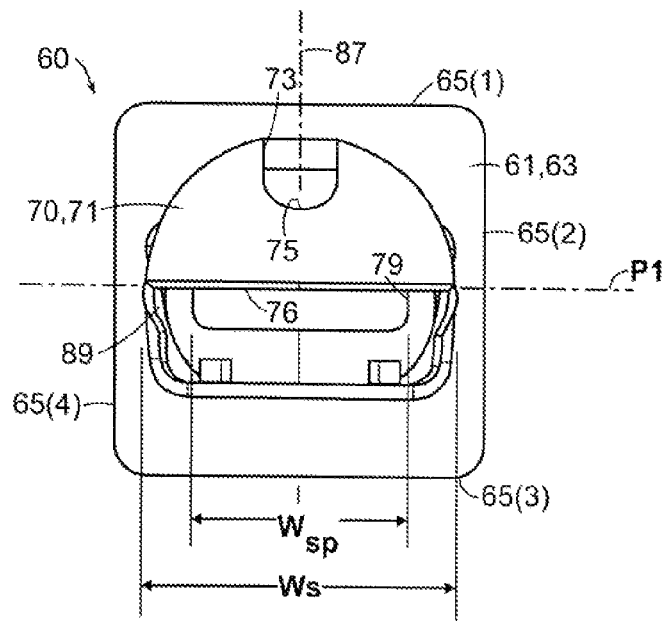
FIG. 14

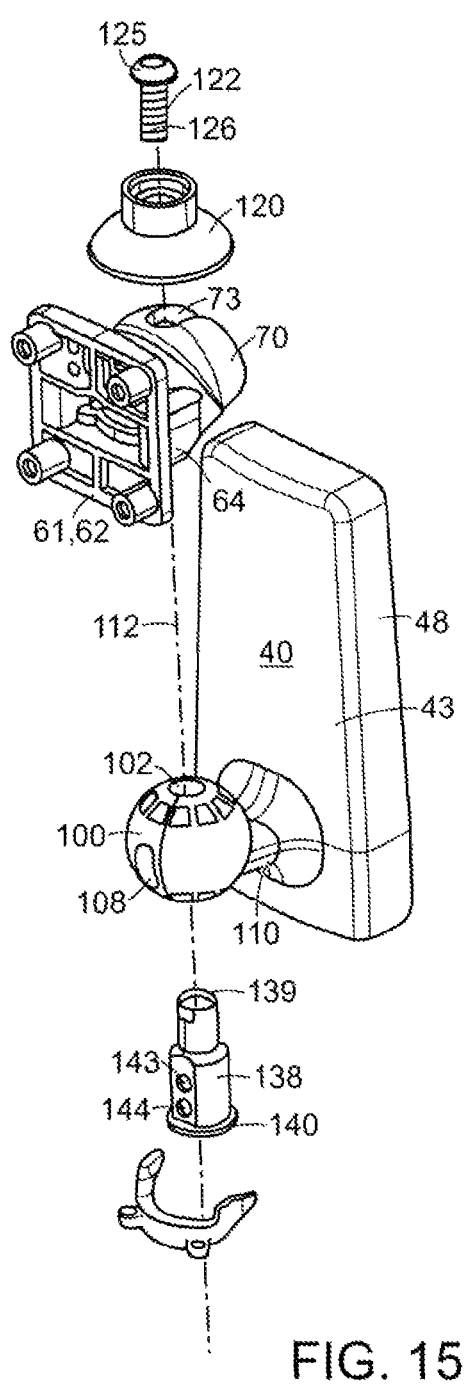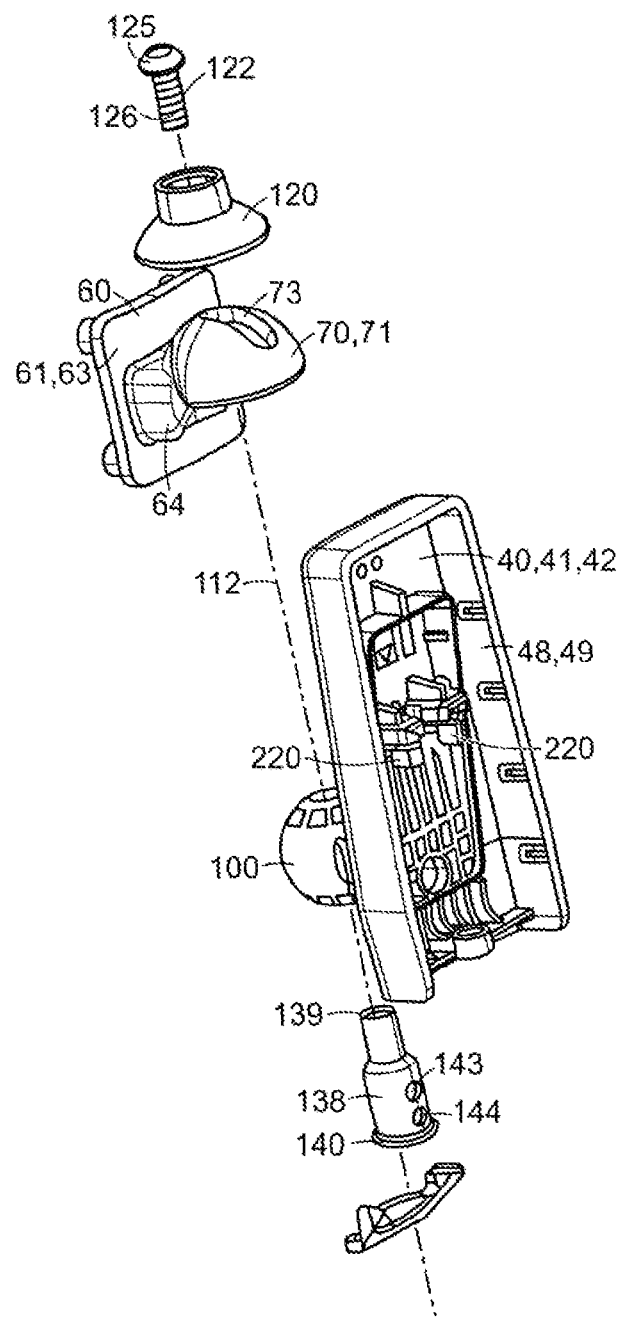
FIG. 15                    FIG. 16

ANGULARLY ADJUSTABLE HOUSING MOUNT ASSEMBLY

BACKGROUND

Audio systems are frequently used in residences and commercial buildings to provide ambiance and/or to allow announcements to be made. For example, audio systems may be provided in malls, restaurants, hotels, office buildings, airports and train stations. They may also be installed outdoors to provide sound delivery, for example to parks, train platforms and parking lots. Audio systems may include an audio source, an amplifier, a control unit for controlling the audio source and amplifier, and speakers. Typically, the speakers are housed in speaker cabinets that are distributed throughout the sound coverage area, and are connected to the control unit via speaker wires. It is desirable to mount the speaker cabinets on a support structure such as a post, wall or ceiling using an unobtrusive mounting system. Moreover, it is desirable to be able to adjust the angular orientation of the speaker cabinet relative to the support structure in order to direct sound emitted from the speaker in a desired direction.

SUMMARY

In some aspects, a bracket assembly for connecting a housing to a support structure includes an outer bracket, and an inner bracket that secures the outer bracket to the support structure. The outer bracket includes an outer endwall having an inward facing surface, an outward facing surface, and a connector that protrudes from the outward facing surface. The outer bracket includes an outer sidewall that surrounds the outer endwall and protrudes from a peripheral edge of the outer endwall in a direction normal to the outer endwall inward facing surface. The outer sidewall includes a tab that protrudes from an inward facing surface of the outer sidewall. The inner bracket includes an inner endwall having an inward facing surface and an outward facing surface, and an inner sidewall that surrounds the inner endwall and protrudes from a peripheral edge of the inner endwall in a direction normal to the inner endwall inward facing surface. The inner sidewall includes a groove formed in an outward facing surface of the inner sidewall, the groove having non-uniform groove width. The inner bracket is disposed within the outer bracket such that the inner surface of the outer sidewall faces the outer surface of the inner sidewall, the tab is disposed in, and engaged with, the groove, and the inner sidewall is disposed between the outer endwall and the inner endwall.

In some embodiments, the outer sidewall has a first edge that adjoins the outer endwall, and a second edge that is parallel to and spaced apart from the first edge, the tab protrudes from the outer sidewall inner surface and is elongated in a direction that is perpendicular to the outer endwall inward facing surface, and the tab has a leading edge that is flush with the outer sidewall second edge, and a trailing edge that is spaced apart from the outer sidewall first edge.

In some embodiments, an outer endwall ramp is provided on the inward facing surface of the outer endwall and includes a first inclined surface, an inner endwall ramp is provided on the inward facing surface of the outer endwall and includes a second inclined surface, and the first inclined surface and the second inclined surface are engaged in such a way that the tab is urged against a surface of the groove.

In some embodiments, the inner sidewall has a first edge that adjoins the inner endwall, and a second edge that is parallel to and spaced apart from the first edge. The groove has a first portion and a second portion, an intersection of the groove first portion with the inner sidewall second edge defining a groove opening. The groove first portion has a first groove width and extends toward the inner sidewall first edge. The groove second portion is in communication with the groove first portion and is spaced apart from the inner sidewall second edge. The groove second portion has a second groove width that is greater than the first groove width. The groove width is a dimension of the groove in a direction parallel to the first edge.

In some embodiments, the groove includes a groove shoulder at the transition between the first groove portion and the second groove portion. In addition, the tab is disposed in the second groove portion and confronts the groove shoulder when the inner bracket is assembled with the outer bracket.

In some embodiments, the inner endwall includes an inner endwall first end, an inner endwall second end that is parallel to and spaced apart from the inner endwall first end, and an inner endwall ramp that is spaced apart from the inner sidewall and protrudes from the inward facing surface of the inner endwall. The inner endwall ramp extends along a line that is perpendicular to the inner endwall first end. The inner endwall ramp has a first ramp height at a first end of the inner endwall ramp. The inner endwall ramp has a second ramp height at a second end of the inner endwall ramp. The first end of the inner endwall ramp is disposed between the inner endwall first end and the second end of the inner endwall ramp, and the first ramp height is less than the second ramp height. In addition, the outer endwall includes an outer endwall first end, an outer endwall second end that is parallel to and spaced apart from the outer endwall first end, and an outer endwall ramp that is spaced apart from the outer sidewall and protrudes from the inward facing surface of the outer endwall. The outer endwall ramp extends along a line that is perpendicular to the outer endwall first end. The outer endwall ramp has a third ramp height at a first end of the outer endwall ramp. The outer endwall ramp has a fourth ramp height at a second end of the outer endwall ramp. The first end of the outer endwall ramp is disposed between the outer endwall first end and the second end of the outer endwall ramp, and the fourth ramp height is less than the third ramp height.

In some embodiments, the inner endwall ramp includes a free edge, and the free edge is formed having a channel that is configured to receive a gasket.

In some embodiments, the outer bracket includes an outer bracket electrical terminal, the inner bracket includes an inner bracket electrical terminal, and the outer bracket electrical terminal and the inner bracket electrical terminal are configured to automatically engage upon engagement of the tab with the groove.

In some embodiments, the connector is a ball joint.

In some aspects, an audio speaker device includes a speaker cabinet, and a bracket assembly that is secured to the speaker cabinet and is configured to connect the speaker cabinet to a support structure. The bracket assembly includes an outer bracket, and an inner bracket that secures the outer bracket to the support structure. The outer bracket includes an outer endwall having an inward facing surface, an outward facing surface, and a connector that protrudes from the outward facing surface. The outer bracket includes an outer sidewall that surrounds the outer endwall and protrudes from a peripheral edge of the outer endwall in a direction normal to the outer endwall inward facing surface. The outer sidewall includes a tab that protrudes from an inward facing surface of the outer sidewall. In addition, the inner bracket includes an inner endwall having an inward facing surface and an outward facing surface, and an inner sidewall that surrounds the inner endwall and protrudes from a peripheral edge of the inner endwall in a direction normal to the inner endwall inward facing surface. The inner sidewall includes a groove formed in an outward facing surface of the inner sidewall, the groove having non-uniform groove width. The inner bracket is disposed within the outer bracket such that the inner surface of the outer sidewall faces the outer surface of the inner sidewall, the tab is disposed in, and engaged with, the groove, and the inner sidewall is disposed between the outer endwall and the inner endwall.

In some embodiments, the outer sidewall has a first edge that adjoins the outer endwall, and a second edge that is parallel to and spaced apart from the first edge, the tab protrudes from the outer sidewall inner surface and is elongated in a direction that is perpendicular to the outer endwall inward facing surface, and the tab has a leading edge that is flush with the outer sidewall second edge, and a trailing edge that is spaced apart from the outer sidewall first edge.

In some embodiments, an outer endwall ramp is provided on the inward facing surface of the outer endwall and includes a first inclined surface, an inner endwall ramp is provided on the inward facing surface of the outer endwall and includes a second inclined surface, and the first inclined surface and the second inclined surface are engaged in such a way that the tab is urged against a surface of the groove.

In some embodiments, the inner sidewall has a first edge that adjoins the inner endwall, and a second edge that is parallel to and spaced apart from the first edge. In addition, the groove has a first portion and a second portion. An intersection of the groove first portion with the inner sidewall second edge defines a groove opening. The groove first portion has a first groove width and extends toward the inner sidewall first edge. The groove second portion is in communication with the groove first portion and is spaced apart from the inner sidewall second edge. The groove second portion has a second groove width that is greater than the first groove width, where the groove width is a dimension of the groove in a direction parallel to the first edge.

In some embodiments, the groove includes a groove shoulder at the transition between the first groove portion and the second groove portion, and the tab is disposed in the second groove portion and confronts the groove shoulder when the inner bracket is assembled with the outer bracket.

In some embodiments, the inner endwall includes an inner endwall first end, an inner endwall second end that is parallel to and spaced apart from the inner endwall first end, and an inner endwall ramp that is spaced apart from the inner sidewall and protrudes from the inward facing surface of the inner endwall. The inner endwall ramp extends along a line that is perpendicular to the inner endwall first end. The inner endwall ramp has a first ramp height at a first end of the inner endwall ramp. The inner endwall ramp has a second ramp height at a second end of the inner endwall ramp. The first end of the inner endwall ramp is disposed between the inner endwall first end and the second end of the inner endwall ramp, and the first ramp height is less than the second ramp height. In addition, the outer endwall includes an outer endwall first end, an outer endwall second end that is parallel to and spaced apart from the outer endwall first end, and an outer endwall ramp that is spaced apart from the outer sidewall and protrudes from the inward facing surface of the outer endwall. The outer endwall ramp extends along a line that is perpendicular to the outer endwall first end. The outer endwall ramp has a third ramp height at a first end of the outer endwall ramp. The outer endwall ramp has a fourth ramp height at a second end of the outer endwall ramp. The first end of the outer endwall ramp is disposed between the outer endwall first end and the second end of the outer endwall ramp, and the fourth ramp height is less than the third ramp height.

In some embodiments, the inner endwall ramp includes a free edge, and the free edge is formed having a channel that is configured to receive a gasket.

In some embodiments, the inner endwall ramp and the outer endwall ramp each have the appearance of a rectangular frame when viewed in a direction perpendicular to the inner endwall inward facing surface.

In some embodiments, the outer bracket includes an outer bracket electrical terminal, the inner bracket includes an inner bracket electrical terminal, and the outer bracket electrical terminal and the inner bracket electrical terminal are configured to automatically engage upon engagement of the tab with the groove.

In some embodiments, the connector is a ball joint.

In some aspects, the bracket assembly is used to secure a speaker disposed in a speaker cabinet to a support structure such as a post, wall or ceiling. The bracket assembly includes an inner bracket, an outer bracket and a connector. The inner bracket is configured to be mounted on the support structure, and includes electrical connectors that may be electrically connected to the speaker wires of the audio system. The outer bracket is configured to be mounted on the inner bracket and includes electrical connectors that automatically engage with the electrical connectors of the inner bracket when the outer bracket is mounted on the inner bracket. By this configuration, the inner bracket can be mounting at an initial time for example during an early stage of building construction, and the remainder of the bracket assembly and the speaker can be installed at a subsequent time, for example a late or finishing stage of building construction. As a result, damage to, or theft of, the speaker is avoided during building construction.

The inner and outer brackets each include surface features that cooperate to allow a quick and reliable mechanical connection of the outer bracket to the inner bracket. The surface features are also configured to guide the outer bracket electrical connectors into engagement with the inner bracket electrical connectors as the mechanical connection is made. This feature reduces the effort required to mount the speaker since the speaker including the speaker cabinet can be relatively large and heavy. Providing the electrical connections within the inner bracket may also reduce installation time since the installer only needs to make a simple electrical connection between the inner bracket and the speaker wire. Optionally, the inner bracket may be covered with a dust cover, and the final installation of the remainder of the speaker bracket assembly and speaker may take place at a much later time and no further wiring is needed.

In some aspects, the interconnection between the outer bracket and the connector is configured to allow the angular orientation of the speaker cabinet to be adjusted relative to the inner bracket. The interconnection between the outer bracket and the connector is a ball and socket connection that allows articulation over a wide range of angles in two orthogonal planes. For example, when the bracket assembly is mounted to a wall or other vertical support surface, the ball and socket connection allows the speaker cabinet to be adjusted over a range of plus or minus 45 degrees relative to a longitudinal axis of the ball stem in a horizontal plane regardless of vertical plane position, and to be adjusted downward over a range of 0 degrees to 45 degrees relative to the longitudinal axis of the ball stem in a vertical plane, regardless of horizontal plane position. This can be compared to some conventional bracket assemblies that provide angular adjustment in both the vertical and horizontal plane, but that are formed such that horizontal adjustability is zero or minimal while also adjusted to 45 degrees vertically downward.

Advantageously, the outer bracket including the ball and the connector including the socket are assembled together independently of the inner wall bracket, and the relative angular orientation of the socket relative to the ball may be adjusted and fixed prior to mounting the outer bracket to the inner bracket. For example, an installer can set the speaker cabinet angle by adjusting the relative angle of the outer bracket and connector while standing on the ground, and after the adjustment is made and set can then climb a ladder and use the quick connect electrical and mechanical connection features to quickly and easily mount the outer bracket along with the speaker cabinet to the inner bracket. This feature avoids a common situation in which the installer must adjust a speaker bracket and mount it to a support structure while supporting the weight of the speaker including the speaker cabinet, or enlist the aid of another installer who can support the speaker while the first installer secures and adjusts the bracket.

The bracket assembly including the ball and socket connection also provides an internal passageway for the speaker wires. Thus, the speaker wires that connect the speakers within the speaker cabinet to a remote audio source are completely hidden from view, whereby the appearance of the audio system is improved, the speaker cabinet and bracket assembly are made less obtrusive, and damage and/or theft protection is further improved.

In some aspects, the outer bracket includes a ball that is mounted to an outer base via ball stem, and the connection portion includes a socket that is mounted to a connector plate via a socket stem, and the socket is configured to receive the ball therein to form a ball and socket connection. The bracket assembly further includes a clamping assembly that when released allows adjustment of the relative positions between the ball and the socket, and when secured prevents adjustment of the relative positions between the ball and the socket. In particular, the clamping assembly is configured to clamp the socket between the ball and a socket cover. A socket facing surface of the socket cover includes surface features that improve frictional engagement between the socket cover and the socket, further improving the reliability of the clamping effect of the clamping assembly.

In some aspects, the bracket assembly includes features that prevent moisture from entering the speaker cabinet and the interior space defined between the inner and outer brackets. By preventing moisture from entering the speaker cabinet and the interior space defined between the inner and outer brackets, the electrical components housed in these locations are protected from moisture. To this end, the bracket assembly includes sealing elements disposed at each end of the speaker wire path through the bracket assembly. In particular, a seal is provided at the speaker wire opening of the speaker cabinet, and at an outer surface of the inner bracket. In addition, the bracket assembly includes a gasket? Seal disposed between mating surfaces of the inner and outer bracket, the gasket seal surrounding the inner space defined between the inner and outer brackets that includes the electrical connectors. Finally, the bracket assembly includes a further seal disposed in the speaker wire passageway within the ball stem, which prevents moisture that enters the ball and socket joint from entering the interior space via the ball stem.

BRIEF DESCRIPTION OF FIGURES

FIG. 8 is a front perspective view of the inner bracket.

FIG. 9 is a rear perspective view of the outer bracket.

FIG. 12 is a front perspective view of the connector.

FIG. 13 is a rear perspective view of the connector.

FIG. 14 is a front plan view of the connector.

FIG. 15 is an exploded front perspective view of the connector, outer bracket and clamp assembly, with the inner bracket omitted for clarity.

FIG. 16 is an exploded rear perspective view of the connector, outer bracket and clamp assembly, with the inner bracket omitted for clarity.

DETAILED DESCRIPTION

Figure 1:
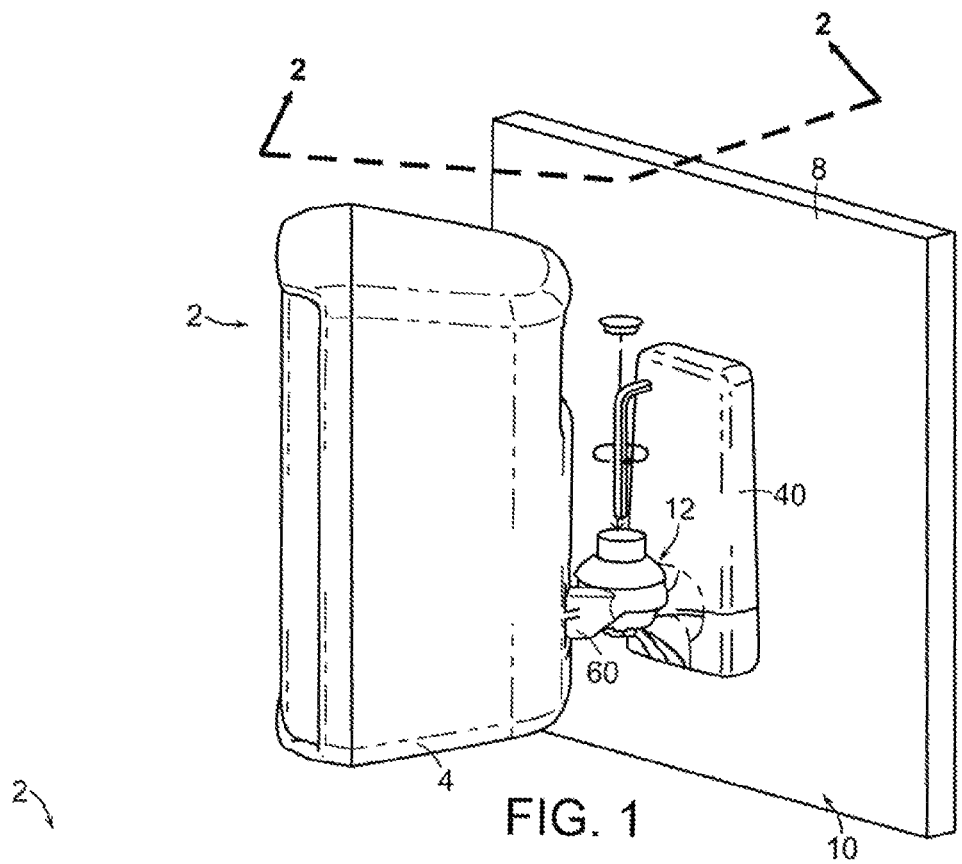
FIG. 1 is a front perspective view of an audio speaker device that is mounted on a support structure using a bracket assembly.
Figure 2:
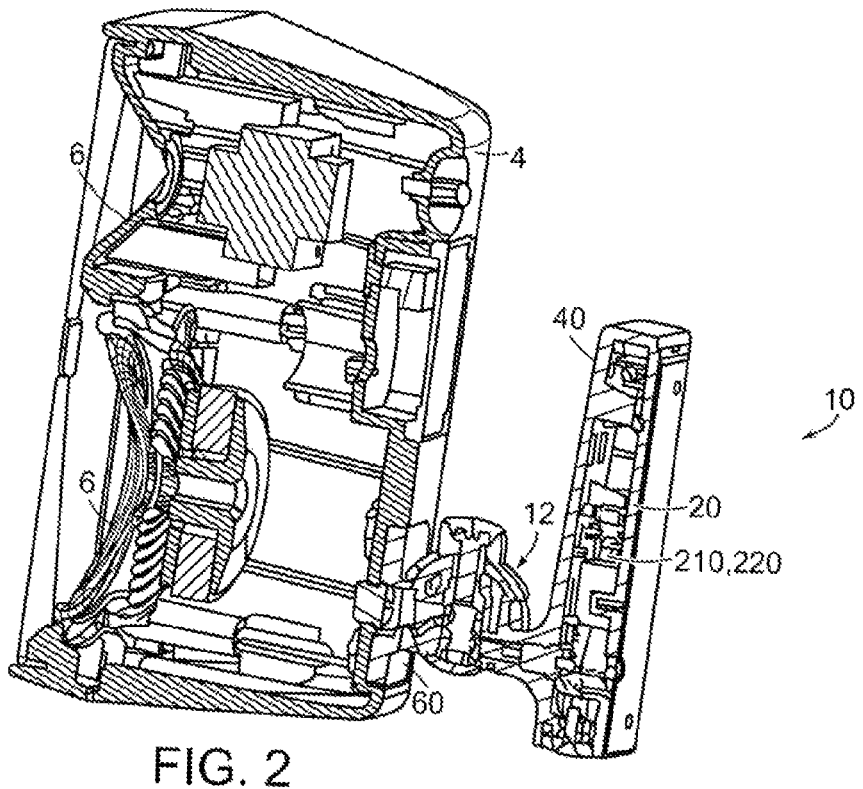
FIG. 2 is a cross sectional view of the audio speaker device as seen along line 2-2 of FIG. 1.

Referring to FIGS. 1 and 2, an audio speaker device 2 includes a speaker 6 disposed in a speaker cabinet 4, and a bracket assembly 10 that is used to secure the speaker cabinet 4 to a support structure 8 such as a post, wall or ceiling. The bracket assembly 10 includes an inner bracket 20, an outer bracket 40 and a connector 60. The inner bracket 20 is a generally tray shaped member that is configured to be mounted on the support structure 8. The outer bracket 40 is configured to be mounted on the inner bracket 20. To that end, the outer bracket 40 includes a generally tray shaped base that receives the inner bracket 20. The outer bracket base cooperates with the inner bracket 20 to define an interior space that houses electrical connections between the inner and outer brackets 20, 40 as discussed in detail below.

The outer bracket 40 includes the ball 100 of a ball and socket joint 12, and the connector 60 includes the corresponding socket 70. The ball 100 and socket 70 cooperatively engage to allow the angular orientation of the speaker cabinet 4 to be adjusted relative to the outer and the inner brackets 20, 40. In particular, the ball and socket interconnection between the outer bracket 40 and the connector 60 allows articulation over a wide range of angles in two orthogonal planes, as discussed in detail below. In addition, the bracket assembly 10 includes features that reliably retain the ball 100 and socket 70 in a desired relative angular orientation, as discussed in detail below.

Figure 3:
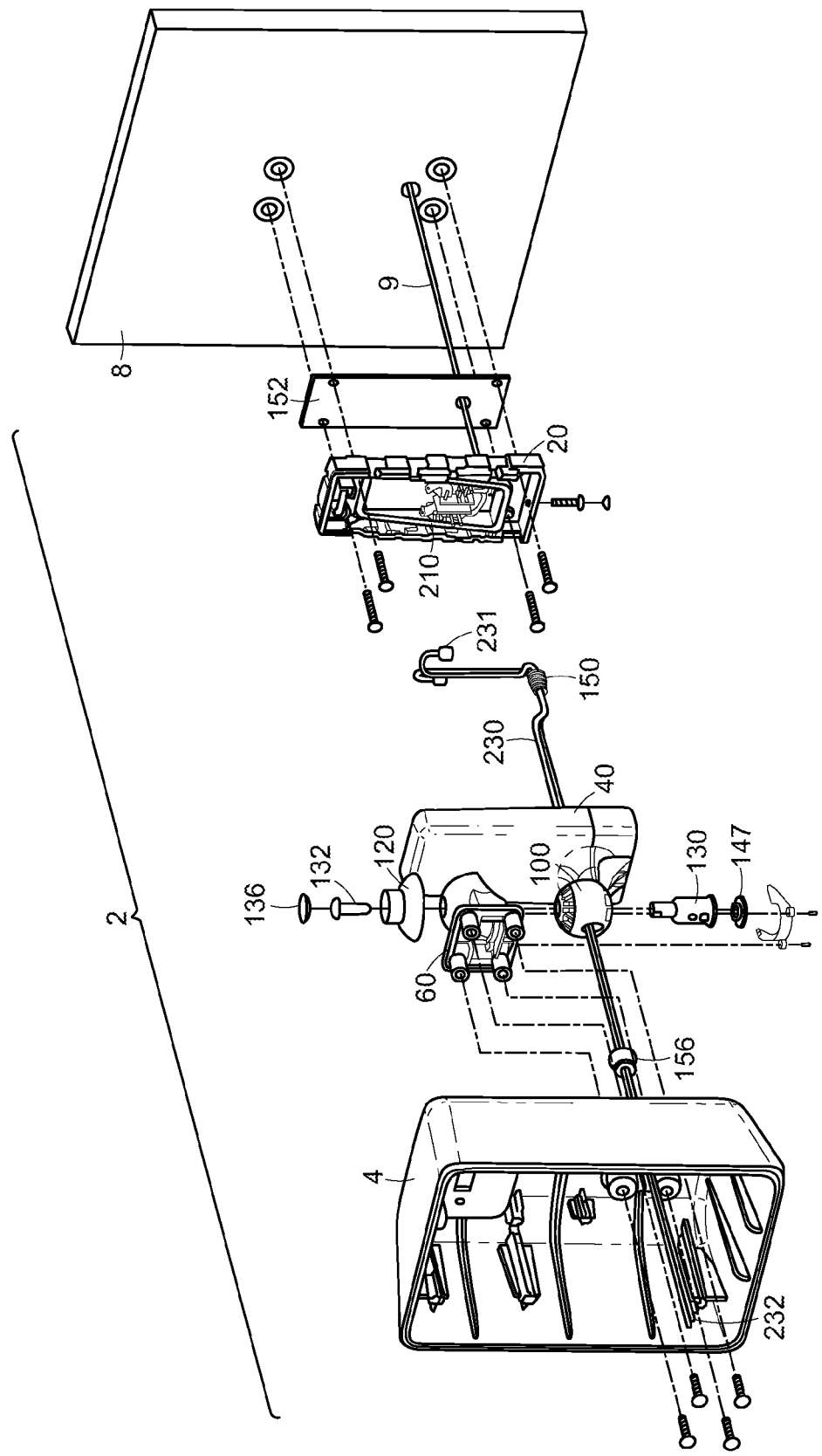
FIG. 3 is an exploded perspective view of the audio speaker device of FIG. 1.
Figure 4:
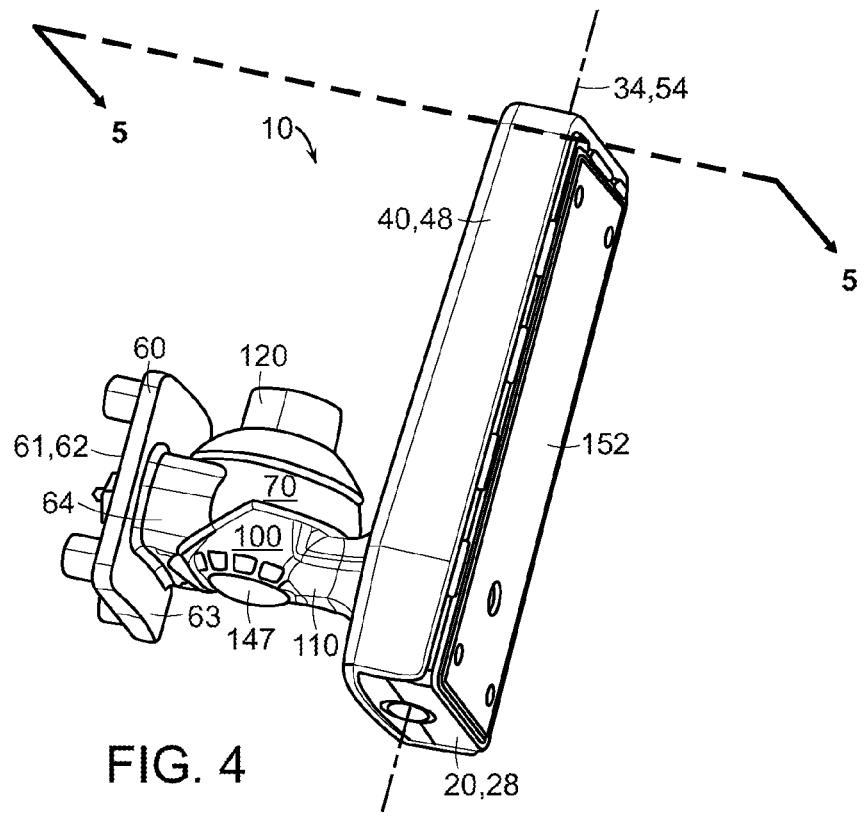
FIG. 4 is a rear perspective view of the bracket assembly of FIG. 1.

Referring also to FIG. 3, the inner bracket 20 includes electrical connectors that may be electrically connected to the speaker wires of the audio system, which may be delivered to the inner bracket 20 through the support structure 8. The outer bracket 40 is configured to be mounted on the inner bracket 20. The outer bracket 40 includes electrical connectors 220 that automatically engage with the electrical connectors 210 of the inner bracket 20 when the outer bracket 40 is mounted on (e.g., becomes mechanically engaged with) the inner bracket 20. The bracket assembly 10 includes a wiring harness 230 that is electrically connected at one end to the outer bracket electrical connectors 220 and at the opposed end to the speaker 6. To that end, the wiring harness 230 extends through the interior space defined between the inner and outer brackets 20, 40, the ball stem 110, the ball 100, the socket 70, the socket stem 64, the connector plate 60, and the speaker cabinet. The bracket assembly 10 includes features that result in the electrical connection between the inner bracket and outer bracket electrical connectors 210, 220 upon assembly of the outer bracket 40 with the inner bracket 20, as discussed in detail below. The bracket assembly 10 includes features that allow the electrical connection between an audio source (not shown) and the speaker 6 to be hidden from an exterior view of the audio speaker device 2, as discussed in detail below. The bracket assembly 10 includes features that prevent moisture from entering the interior space between the inner and outer brackets 20, 40 that encloses the inner bracket and outer bracket electrical connectors 210, 220, including moisture that penetrates into the bracket assembly 10 via the ball and socket joint 12, as discussed in detail below. The outer bracket 40 and the connector 60 include features that allows articulation of the ball and socket joint 12 over a wide range of angles in two orthogonal planes, while accommodating passage of the wiring harness therethrough, as discussed in detail below.

Referring to FIGS. 4-8, the inner bracket 20 of the bracket assembly 10 is disposed within the outer bracket 40 and is configured to secure the outer bracket 40 to the support structure 8. The inner bracket 20 is generally tray shaped and includes an inner endwall 21 that is surrounded by an inner sidewall 28. The inner end wall 21 has an inward facing surface 22 and an outward facing surface 23 that are bordered by a common peripheral edge 26.

A first wiring through hole 27 is formed in the inner endwall 21. The first wiring through hole 27 provides a port through which a signal wire 9 extends. For example, the signal wire 9 may be electrically connected to the audio source and carry the audio signal from the audio source. The inner endwall 21 also includes fastener through holes 33 that receive fasteners such as screws that are used to secure the inner bracket to the support structure 8.

The inner sidewall 28 protrudes from the inner endwall peripheral edge 26 in a direction normal to the inner endwall inward facing surface 22. The inner sidewall 28 has a first edge 31 that is joined to the inner endwall 21, and a second edge 32 that is parallel to, and spaced apart from, the first edge 31. A height of the inner sidewall corresponds to the distance between the inner sidewall first edge 31 and the inner sidewall second edge 32.

The inner sidewall 28 has four sides 28(1), 28(2), 28(3), 28(4), and includes a pair of long sides 28(2), 28(4). The long sides 28(2), 28(4) are equal in length and are joined at a first end 24 of the inner endwall 21 by a first short side 28(1), and are joined at the opposed, second end 25 of the inner endwall 21 by a second short side 28(3), where the second short side 28(3) is parallel to, and slightly longer than, the first short side 28(1). The height of the long sides 28(2), 28(4) at the inner endwall first end 24 is less than the height of the long sides 28(2), 28(4) at the inner endwall second end 25. An inner bracket longitudinal axis 34 extends through and is perpendicular to the first and second short sides 28(1), 28(3).

The inner sidewall 28 includes grooves 80 that are formed in an outward facing surface 30 of the inner sidewall 28. Each groove 80 is generally L shaped and thus has a non-uniform groove width, where the groove width refers to a dimension of the groove 80 in a direction parallel to the inner sidewall first edge 31 in the vicinity of the groove 80 and the inner bracket longitudinal axis 34. In particular, each groove 80 has a groove first portion 81 having a first groove width wg1, and a groove second portion 82 having a second groove width wg2. The second groove width wg2 is greater than the first groove width wg1. The groove first portion 81 is spaced apart from the inner sidewall first edge 31. The groove first portion 81 intersects the inner sidewall second edge 32, and the intersection of the groove first portion 81 with the inner sidewall second edge 32 defines a groove opening 83. The groove first portion 81 extends toward the inner sidewall first edge 31 and communicates with the groove second portion 82. The groove second portion 82 is spaced apart from the inner sidewall second edge 32 and is disposed between the groove first portion 81 and the inner sidewall first edge 31. Each groove 80 includes a groove shoulder 84 at the transition between the first groove portion 81 and the second groove portion 82. In use, the grooves 80 receive and retain tabs 90 provided on the outer bracket 40, as discussed below.

The inner bracket 20 includes an inner endwall ramp 160. The inner endwall ramp 160 is an inclined feature that protrudes inward from the inner endwall inward facing surface 22. The inner endwall ramp 160 cooperates with a corresponding outer endwall ramp 170 provided on the outer bracket 40 to facilitate formation of a secure mechanical connection and moisture seal between the inner bracket 20 and the outer bracket 40, as discussed in detail below.

The inner endwall ramp 160 is spaced apart from the inner sidewall 28, and has four rails 166, 167, 168, 169 that are arranged together to form a hollow closed section having a rectangular profile. As a result, the inner endwall ramp 160 has the appearance of a rectangular frame when viewed in a direction perpendicular to the inner endwall inward facing surface 22. The inner endwall ramp 160 encircles a central portion 200 of the inner bracket endwall 21 when viewed in a direction perpendicular to the inner bracket inward facing surface 22. In particular, the inner endwall ramp 160 includes a first rail 166 that is parallel to the first short side 28(1) of the inner sidewall 21, a second rail 167 that is perpendicular to the first short side 28(1) of the inner sidewall 21, a third rail 168 that is parallel and adjacent to the third short side 28(3) of the inner sidewall 21, and a fourth rail 169 that is parallel to the third rail 168.

Each rail 166, 167, 168, 169 includes a fixed edge 162 that is joined to the inner endwall inward facing surface 22, and an opposed free edge 164 that is spaced apart from the fixed edge 162. The free edge 164 of the inner endwall ramp 160 has a channel 165 that defines a rectangular seat that is configured to receive a seal such as a rectangular gasket 154.

Figure 6:
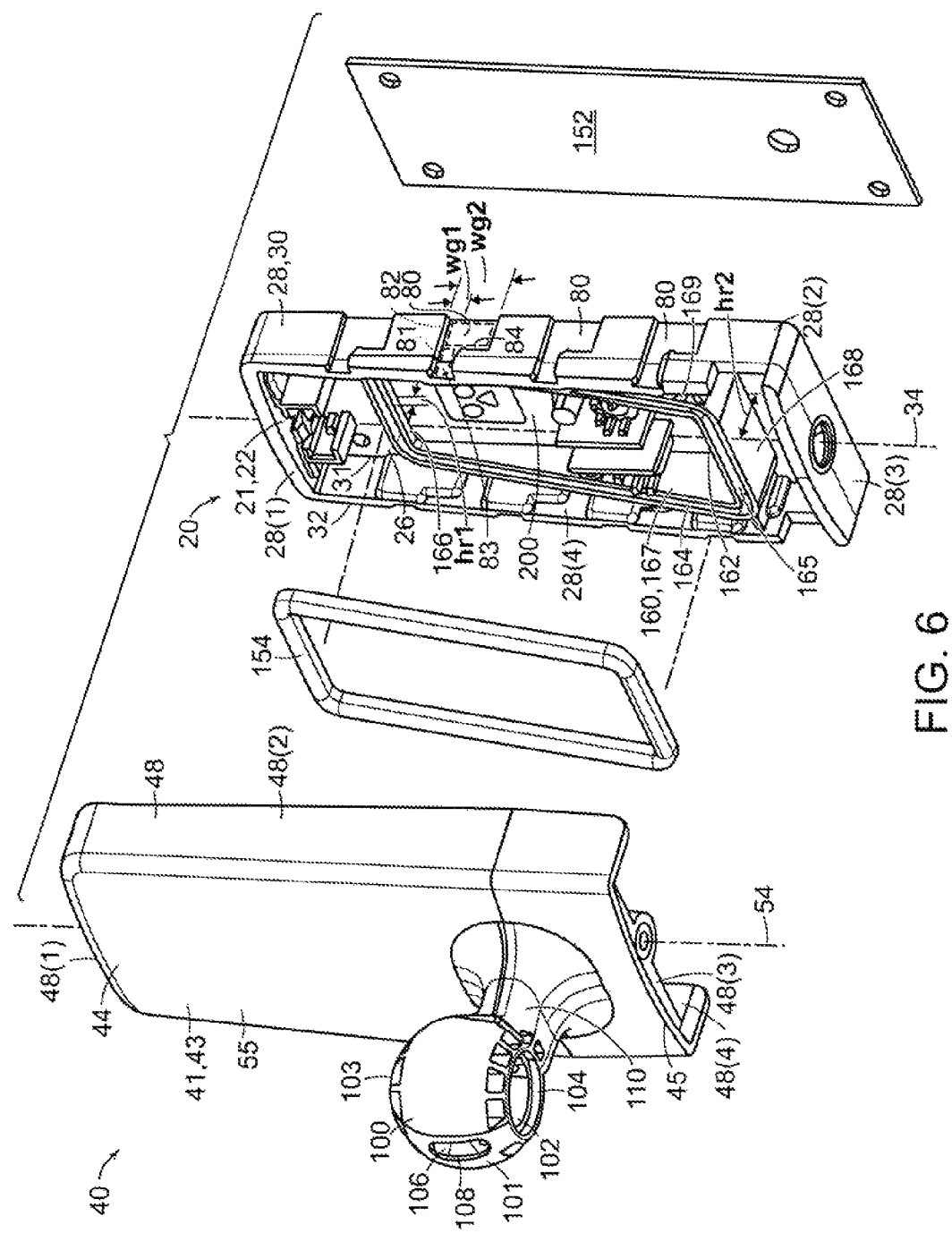
FIG. 6 is an exploded front perspective view of the outer bracket and inner bracket, with the connector and clamp assembly omitted for clarity.

Referring to FIG. 6, a height of the inner endwall ramp 160 corresponds to a distance between the ramp fixed edge 162 and the ramp free edge 164. The first rail 166, which is disposed adjacent to the inner endwall first end 24, has a first ramp height hr1 that is a constant height along its length. The third rail 168 has a second ramp height hr2 that is a constant height along its length, and the second ramp height hr2 is greater than the first ramp height hr1. The second rail 167 extends between one end of each of the first and third rails 166, 168, and the fourth rail 169 extends between an opposed end of each of the first and third rails 166, 168. The second and fourth rails 167, 169 have a height corresponding to the first ramp height hr1 at a location adjacent to the first rail and a height corresponding to the second ramp height hr2 at a location adjacent to the third rail 168. The height of the second and fourth rails 167, 169 linearly increases from the first ramp height hr1 at the first rail 166 to the second ramp height hr2 at the third rail 168.

Referring to FIG. 8, the inner bracket 20 includes a pair of inner bracket electrical terminals 210 that are provided on the inner endwall inward facing surface 22. The inner bracket electrical terminals 210 are surrounded by the inner endwall ramp 160. In the illustrated embodiment, each of the inner bracket electrical terminals 210 is formed of an electrically conductive U-shaped spring having legs that are spring biased together to form a female socket that is aligned with the inner bracket longitudinal axis 34 and opens toward the inner endwall first end 24. Each of the inner bracket electrical terminals 210 is electrically connected to a corresponding electrical conductor of the audio source signal wire 9.

Referring to FIGS. 4-7 and 9, the outer bracket 40 includes an outer base 55 and a spherical ball 100 connected to the outer base 55 via a ball stem 110 that protrudes from an outward facing surface of the outer base 55.

The outer base 55 is generally tray shaped and includes an outer endwall 41 that is surrounded by an outer sidewall 48. The outer end wall 41 has an inward facing surface 42 and an outward facing surface 43 that are bordered by a common peripheral edge 46.

The outer sidewall 48 protrudes from the outer endwall peripheral edge 46 in a direction normal to the outer endwall inward facing surface 42. The outer sidewall 48 has a first edge 51 that is joined to the outer endwall 41, and a second edge 52 that is parallel to, and spaced apart from, the first edge 51. A height of the outer sidewall corresponds to the distance between the outer sidewall first edge 51 and the outer sidewall second edge 52.

The outer sidewall 48 has four sides 48(1), 48(2), 48(3), 48(4), and includes a pair of long sides 48(2), 48(4). The long sides 48(2), 48(4) are equal in length and are joined at a first end 44 of the outer endwall 41 by a first short side 48(1), and are joined at the opposed, second end 45 of the outer endwall 41 by a second short side 48(3), where the second short side 48(3) is parallel to, and slightly longer than, the first short side 48(1). The height of the long sides 48(2), 48(4) at the outer endwall first end 44 is less than the height of the long sides 48(2), 48(4) at the outer endwall second end 45. An outer bracket longitudinal axis 54 extends through and is perpendicular to the first and second short sides 48(1), 48(3).

The outer sidewall 48 includes tabs 90 that protrude from an inward facing surface 49 of the outer sidewall 48. Each tab 90 is elongated in a direction that is perpendicular to the outer endwall inward facing surface 41. In addition, each tab 90 has a leading edge 91 that is flush with the outer sidewall second edge 52, and a trailing edge 92 that is spaced apart from the outer sidewall first edge 51. The leading edge 91 is inclined relative to the outer sidewall inward facing surface 49, whereas the trailing edge 92 is normal to the outer sidewall inward facing surface 49. The tabs 90 cooperate with the grooves 80 to guide relative movement of the inner bracket 20 relative to the outer bracket 40 during assembly of the bracket assembly 10. In addition, upon assembly, the tabs 90 cooperate with the grooves 80 to retain the inner and outer brackets 20, 40 in the assembled configuration, as discussed further below.

The outer bracket 40 includes an outer endwall ramp 170. The outer endwall ramp 170 is an inclined feature that protrudes inward from the outer endwall inward facing surface 42. The outer endwall ramp 170 cooperates with a corresponding inner endwall ramp 160 provided on the inner bracket 20 to facilitate formation of a secure mechanical connection and moisture seal between the inner bracket 20 and the outer bracket 40, as discussed in detail below.

The outer endwall ramp 170 is spaced apart from the outer sidewall 48, and has four rails 176, 177, 178, 179 that are arranged together to form a hollow closed section having a rectangular profile. As a result, the outer endwall ramp 170 has the appearance of a rectangular frame when viewed in a direction perpendicular to the outer endwall inward facing surface 42. The outer endwall ramp 170 encircles a central portion 202 of the outer bracket endwall 41 when viewed in a direction perpendicular to the outer bracket inward facing surface 42. In particular, the outer endwall ramp 170 includes a first rail 176 that is parallel to the first short side 48(1) of the outer sidewall 41, a second rail 177 that is perpendicular to the first short side 48(1) of the outer sidewall 41, a third rail 178 that is parallel and adjacent to the third short side 48(3) of the outer sidewall 41, and a fourth rail 179 that is parallel to the third rail 178.

Each rail 176, 177, 178, 179 includes a fixed edge 172 that is joined to the outer endwall inward facing surface 42, and an opposed free edge 174 that is spaced apart from the fixed edge 172. The free edge 174 of the outer endwall ramp 170 is channel-free.

Figure 7:
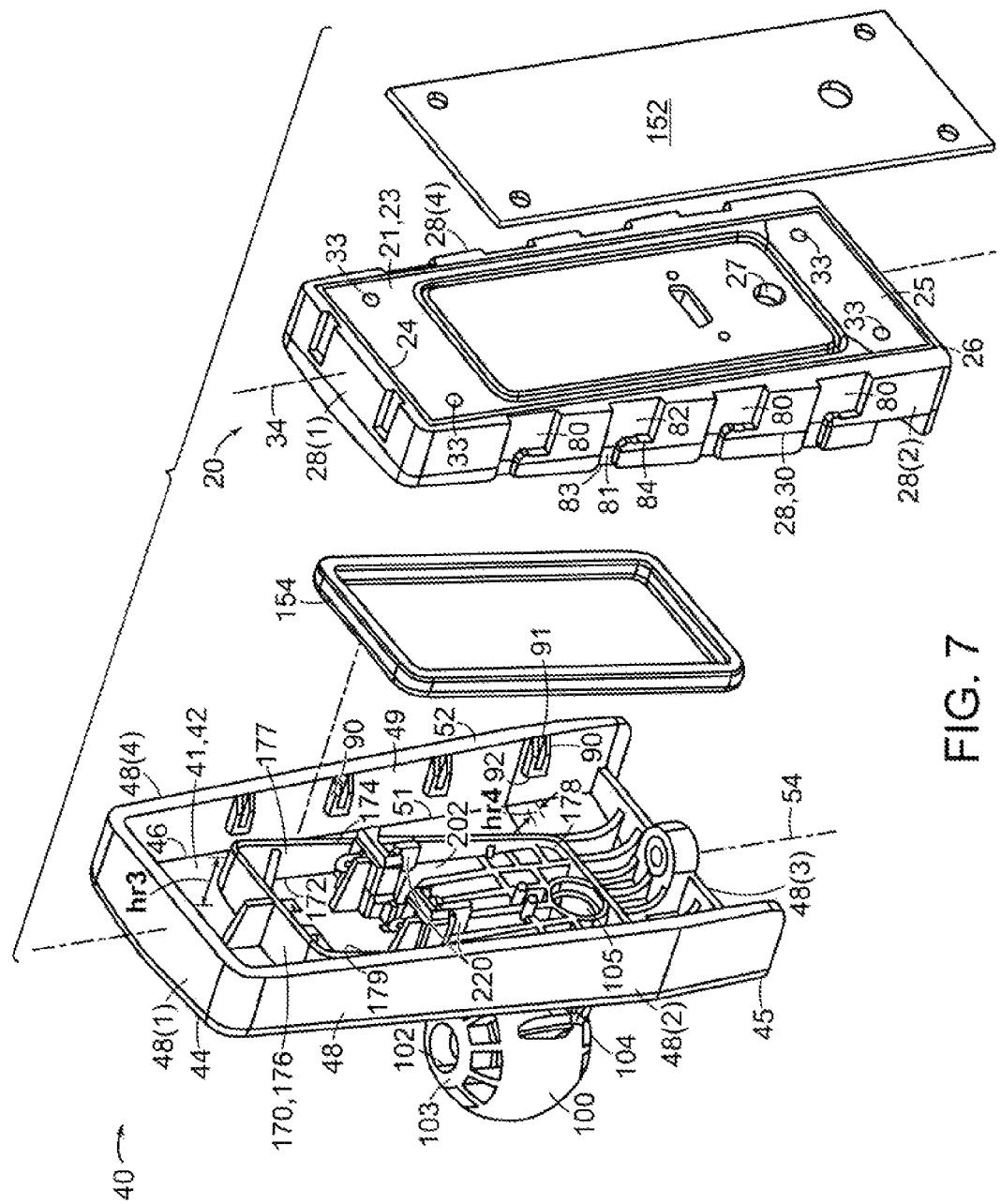
FIG. 7 is an exploded rear perspective view of the outer bracket and inner bracket, with the connector and clamp assembly omitted for clarity.

Referring to FIG. 7, a height of the outer endwall ramp 170 corresponds to a distance between the ramp fixed edge 172 and the ramp free edge 174. The first rail 176, which is disposed adjacent to the outer endwall first end 44, has a third ramp height hr3 that is a constant height along its length. The third rail 178 has a fourth ramp height hr4 that is a constant height along its length, and the fourth ramp height hr4 is less than the third ramp height hr3. The second rail 177 extends between one end of each of the first and third rails 176, 178, and the fourth rail 179 extends between an opposed end of each of the first and third rails 176, 178. The second and fourth rails 177, 179 have a height corresponding to the third ramp height hr3 at a location adjacent to the first rail 176 and a height corresponding to the fourth ramp height hr4 at a location adjacent to the third rail 178. The height of the second and fourth rails 177, 179 linearly decreases from the third ramp height hr3 at the first rail 176 to the fourth ramp height hr4 at the third rail 178.

Figure 5:
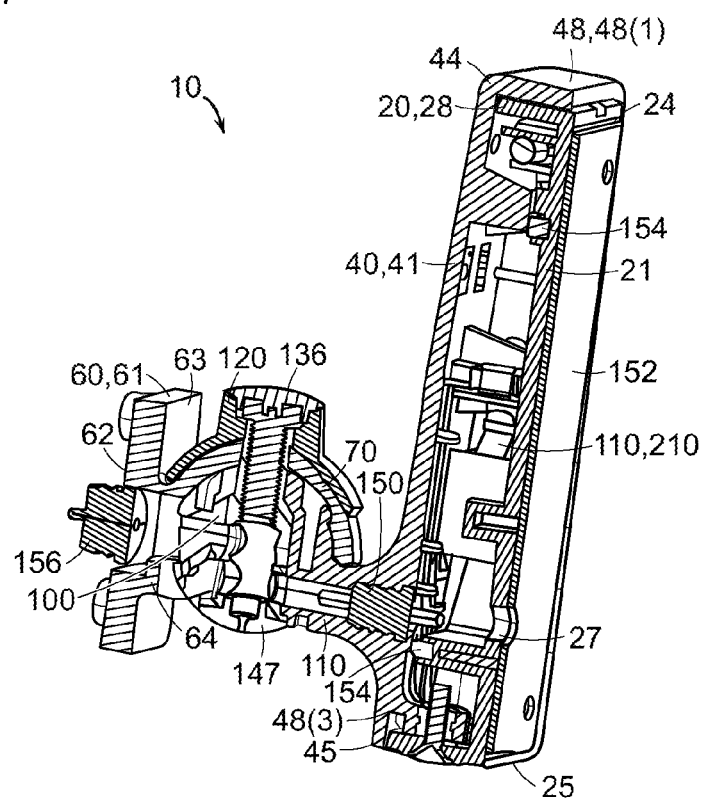
FIG. 5 is a cross sectional view of the bracket assembly as seen along line 5-5 of FIG. 4.
Figures 10, 11:
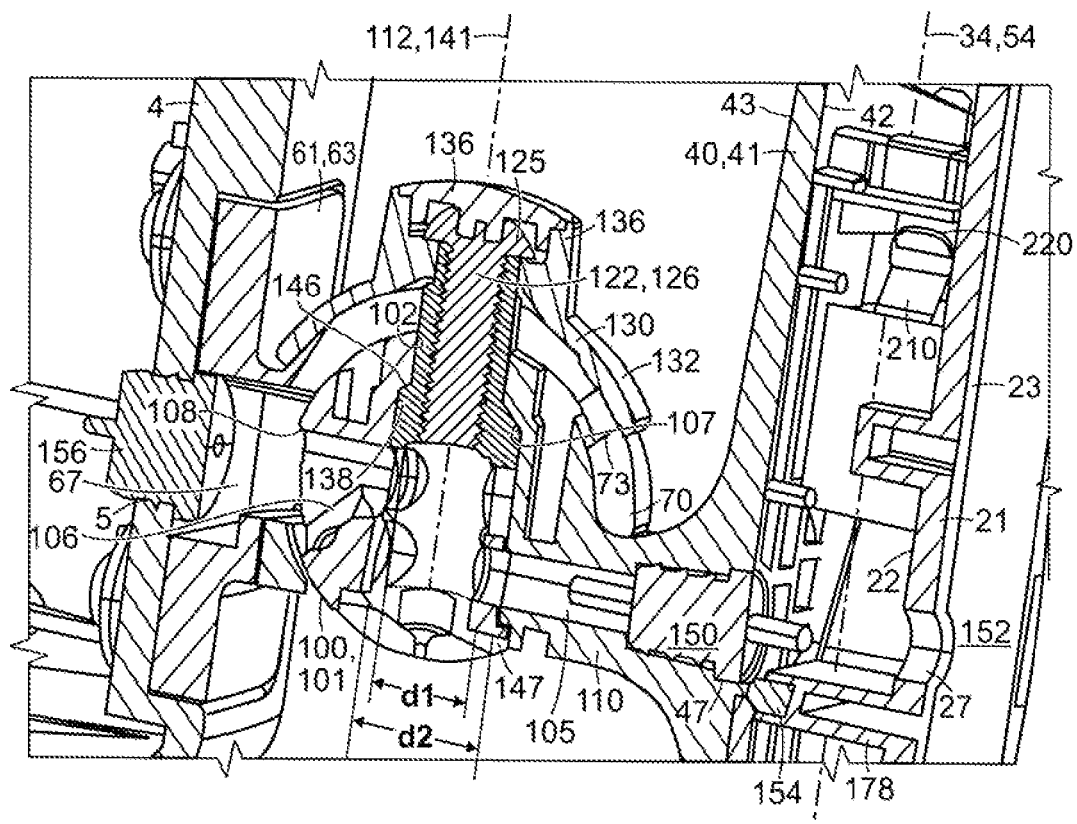
FIG. 10 is a cross sectional view of the ball and socket joint.
FIG. 11 is a cross sectional view of a portion of the outer bracket including the ball and ball stem.
Figure 17:
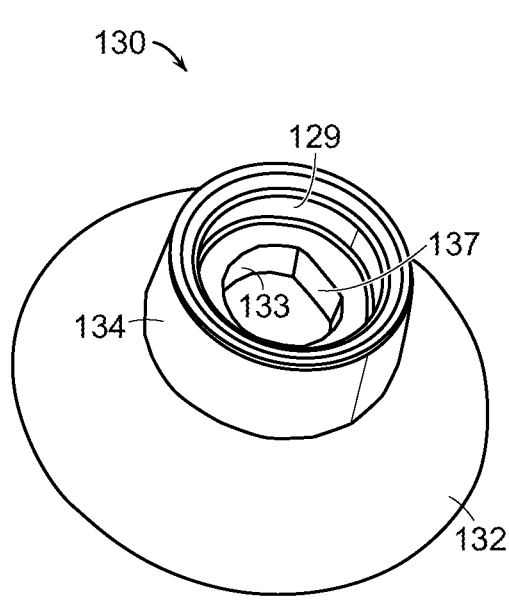
FIG. 17 is a top perspective view of the cap.
Figure 18:
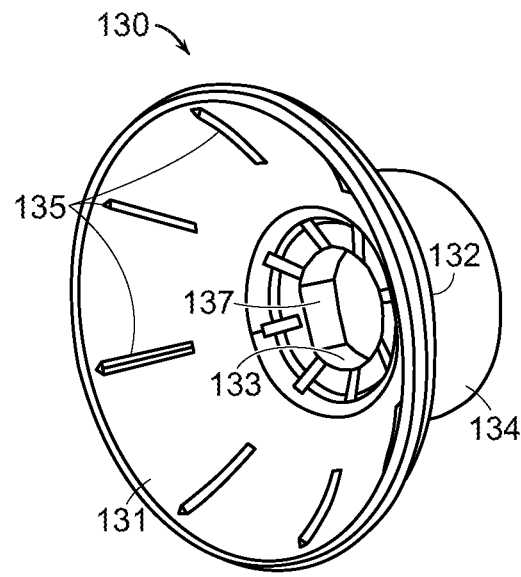
FIG. 18 is a bottom perspective view of the cap.

Referring to FIGS. 5 and 10-11, the ball stem 110 protrudes outward from the outer sidewall outward facing surface 43, and the ball 100 is provided on the distal end of the ball stem 110. The ball stem 110 is hollow, and the hollow interior of the ball stem 110 provides a portion of a first passageway 105 that receives a portion of the wiring harness 230. The first passageway 105 communicates at one end with an interior space of the ball 100 (e.g., the ball through hole 102, described below), and at an opposed end with a second wiring through hole 47 that is formed in the outer endwall 41. The second wiring through hole 47 provides a port through which the wiring harness 230 extends. The wiring harness 230 is electrically connected to electrical conductors 220 provided on the outer bracket 40.

The ball 100 has a spherical ball outer surface 101, and includes a ball through hole 102 that receives a pin 138 that serves both as a pivot axis and part of a clamping assembly 120, as described in detail below. The ball through hole 102 coincides with a ball longitudinal axis 112 that extends in a direction parallel to the outer bracket longitudinal axis 54 and along a diameter of the ball 100 between a first end 103 of the ball 100 and a second end 104 of the ball 100. The ball through hole 102 has a first hole diameter d1 adjacent to the ball first end 103, a second hole diameter d2 adjacent to the ball second end 104, and an inclined hole shoulder 107 disposed at a transition between the first hole diameter d1 and the second hole diameter d2. In addition, the ball through hole 102 has a ball through hole flat 109 that extends longitudinally between the hole shoulder 107 and the ball second end 104. The ball through hole flat 109 is parallel to the outer endwall inward facing surface 42, and is located on a surface of the ball through hole 102 that faces the outer endwall 41. The ball through hole flat 109 cooperates with a corresponding pin flat (e.g., second pin flat 149) formed on an outer surface of the pin 138 to rotationally locate the pin 138 within the ball through hole 102, and to prevent relative rotation between the pin 138 and the ball through hole 102.

In addition, the ball 100 includes a first passageway 105 and a second passageway 106 that direct the wiring harness 230 through the ball 100. The first passageway 105 extends in a direction perpendicular to the outer bracket longitudinal axis 54 through the ball stem 110 and a portion of the ball 100. In particular, one end of the first passageway 105 communicates with the ball through hole 102 and an opposed end of the first passageway 105 communicates with the wiring throughhole 47 in the outer base outer endwall 41. The first passageway 105 is offset from a diameter of the ball 100 so as to be closer to the ball second end 104 than the ball first end 103. The second passageway 106 is disposed on an opposed side of the ball through hole 102 relative to the first passageway 105. The second passageway 106 extends in a direction perpendicular to the outer bracket longitudinal axis 54 along a diameter of the ball 100. In addition, one end of the second passageway 106 communicates with the ball through hole 102 at a location corresponding to the ball through hole flat 109, and an opposed end of the second passageway 106 communicates with a wiring opening 108 in the cabinet facing surface of the ball 100. The wiring opening 108 is elongated in a direction parallel to the outer bracket longitudinal axis 54, and extends from a diameter of the ball 100 toward the ball second end 104. The elongation of the wiring opening 108 provides sufficient space for passage of the wiring harness 230 while also permitting the socket 70 to rotate relative to the ball 100 without interfering with the wiring harness 230.

In some embodiments, the outer bracket 40 including the outer base 55, the ball stem 110 and the ball 100 is formed by injection molding, and thus the ball 100 may include additional vacancies and or surface openings that are required by the molding process in order to reliably achieve the desired spherical shape.

Referring to FIG. 9, the outer bracket 40 includes a pair of outer bracket electrical terminals 220 that are provided on the outer endwall inward facing surface 42. The outer bracket electrical terminals 220 are surrounded by the outer endwall ramp 170. In the illustrated embodiment, each of the outer bracket electrical terminals 220 is formed of an electrically conductive plate that forms a male blade that is aligned with the outer bracket longitudinal axis 54 and extends toward the outer endwall second end 45. Each of the outer bracket electrical terminals 220 is electrically connected to a unique electrical conductor of the wiring harness 230. Each outer bracket electrical terminal 220 is configured to automatically engage with a unique one of the inner bracket electrical terminals 210 during assembly of the inner and outer brackets 20, 40, and more particularly upon engagement of the tabs 90 with the grooves 80 as discussed in detail below.

During assembly of the inner bracket 20 with the outer bracket 40, the inner and outer brackets 20, 40 are oriented so the inner and outer longitudinal axes 34, 54 are parallel and the inner and outer sidewalls 28, 48 are disposed between the inner endwall 21 and the outer endwall 41. In addition, the first ends 24, 44 of the inner and outer endwalls 21, 41 generally coincide except that the outer endwall first end 44 is slightly longitudinally offset relative to the inner endwall first end 24 such that the tabs 90 are longitudinally aligned with corresponding groove openings 83.

The tabs 90 are longitudinally positioned on the outer sidewall 48 such that when each tab 90 is aligned with a corresponding groove opening 83, the first and third sides 48(1), 48(3) of the outer sidewall are longitudinally spaced apart from the first and third sides 28(1), 28(3) of the inner sidewall. In addition, the first and third rails 176, 178 of the outer endwall ramp 170 are longitudinally spaced apart from the first and third rails 166, 168 of the inner endwall ramp 160. In this configuration, the electrical conductors 210 provided on the outer bracket 40 are longitudinally spaced apart from the electrical conductors 220 provided on the inner bracket 20.

The inner sidewall 28 is inserted into the outer sidewall 48 in such a way that the tab leading edge 91 is inserted into the groove opening 83, and the tab 90 is passed through the groove first portion 81 and into the groove second portion 82.

The irregular groove shape allows the tabs 90 to move longitudinally toward the inner endwall second end 25 when the tabs 90 have exited the groove first portion 81 and reside in the groove second portion 82. Thus, the inner bracket 20 is moved relative to the outer bracket along the inner bracket longitudinal axis 54 such that the first and third sides 28(1), 28(3) of the inner sidewall 28 are moved toward the first and third sides 48(1), 48(3) of the outer sidewall 48. At this time, the inclined second and fourth rails 167, 169 of the inner endwall ramp 160 cooperate with inclined second and fourth rails 177, 179 of the outer endwall ramp 170 to drive the trailing edge 92 of the tab 90 toward the groove shoulder 84. In addition, the longitudinal movement causes the electrical conductors 210 provided on the outer bracket 40 to engage and form an electrical connection with the electrical conductors 220 provided on the inner bracket 20.

When the inner bracket 20 is assembled with the outer bracket 40, the inward facing surface 49 of the outer sidewall 48 faces the outward facing surface 30 of the inner sidewall 28, the inner sidewall 28 is disposed between the outer endwall 41 and the inner endwall 21, and the inner sidewall second edge 32 faces the outer endwall inward facing surface 42. In this position, the tab 90 resides in the groove second portion 82 and abuts the groove shoulder 83. The groove shoulder 83 engages the tab 90 and prevents relative movement between the inner and outer brackets 20, 40 in a direction transverse to the respective longitudinal axes 34, 54. In addition, the inner bracket 20 is disposed inside the outer bracket 40 in such a way that the inner endwall ramp 160 is aligned with the outer endwall ramp 170 in a direction perpendicular to the inner endwall inward facing surface 22, and that the first rail 166 of the inner endwall ramp 160 is aligned with the first rail 176 of the outer endwall ramp 170 in a direction perpendicular to the inner endwall inward facing surface 22. As a result, the free edge 164 of the inner endwall ramp 160 faces the free edge 174 of the outer endwall ramp 170 with a seal 154 compressed therebetween. In further addition, the inner bracket 20 is disposed within the outer bracket 40 such that the outer bracket electrical conductors 210 are electrically connected to the inner bracket electrical conductors 220.

Referring to FIGS. 5, 10 and 12-14, the bracket assembly 10 includes the connector 60. The connector 60 includes the socket 70 of the ball and socket joint 12, and is configured to secure the ball and socket joint 12 to the speaker cabinet 4. In particular, the connector 60 includes a connector plate 61 that is secured to the speaker cabinet 4 for example via screws, and the socket 70 that is connected to the connector plate 61 via a socket stem 64.

The connector plate 61 has a generally planar cabinet facing surface 62, and an opposed socket facing surface 63. A connector plate peripheral edge 65 joins the cabinet facing surface 62 to the socket facing surface 63, and defines a rectangular connector plate profile. The connector plate peripheral edge 65 includes a first edge portion 65(1), a second edge portion 65(2), a third edge portion 65(3) and a fourth edge portion 65(4). The first and third edge portions 65(1), 65(3) are parallel and spaced apart, and the second and fourth edge portions 65(2), 65(4) join opposed ends of the first and third edge portions 65(1), 65(3) and are perpendicular to the first and third edge portions 65(1), 65(3). A connector plate longitudinal axis 66 extends through and is perpendicular to the first and third edge portions 65(1), 65(3), and when the ball and socket joint 12 is positioned as shown in FIG. 8, the connector plate longitudinal axis 66 is parallel to the inner bracket longitudinal axis 34 and the outer bracket longitudinal axis 54.

The connector plate socket facing surface 63 is slightly outwardly convex such that the connector plate 61 has a slightly greater thickness in a center of the connector plate 61 than along its second and fourth edge portions 65(2), 65(4). The connector plate 61 includes hollow bosses 85 that protrude outward from the cabinet facing surface 62. The bosses 85 are configured to receive fasteners such as screws that secure the connector plate 61 to the speaker cabinet 4. In the illustrated embodiment, the connector plate 61 includes four bosses 85, one in each corner of the cabinet facing surface 62.

The socket 70 receives the ball 100, and cooperates with the ball 100 in such a way that the angular orientation of the speaker cabinet 4 relative to the support structure 8 is adjustable. To that end, the socket 70 includes a spherical socket inner surface 72 that confronts an outer surface 101 of the ball 100 in the vicinity of the ball first end 103. In addition, the socket 70 includes a spherical socket outer surface 71 that is opposed to the socket inner surface 72, and a socket free edge 76 that corresponds to a periphery of the spherical portions of the socket outer and inner surfaces 71, 72. The socket free edge 76 resides in a first plane P1 that is parallel to the first edge portion 65(1) of the connector plate 61. A gusset 89 extends at an angle between the socket free edge 76 and the connector plate socket facing surface 63. The socket 70 includes a socket through hole 73 that extends between the socket outer surface 71 and the socket inner surface 72. The socket through hole 73 is elongated, and extends along the contour of the socket 70 between a socket through hole first end 74 and a socket through hole second end 75. The socket through hole first end 74 is disposed along a first socket axis 87 that is parallel to the connector plate longitudinal axis 66 and passes through a diameter of the socket 70. The socket through hole second end 75 is disposed along a second socket axis 88 that is at an angle $\theta 1$ relative to the fist socket axis 87, such that the socket through hole second end 75 resides between the socket through hole first end 74 and the socket free edge 76. The angle $\theta 1$ is in a range of 30 to 45 degrees.

The socket stem 64 protrudes outward from the socket facing surface 63 of the connector plate 61, and the socket 70 is disposed on the distal end of the socket stem 64. The socket stem 64 is hollow, and the hollow interior of the socket stem 64 provides a socket stem passageway 67 that receives a portion of the wiring harness 230. The socket stem passageway 67 communicates at one end with an opening 79 in the socket inner surface 72, and thus communicates with an interior space of the socket 70 (e.g., the space surrounded by a socket inner surface 72). An opposed end of the socket stem passageway 67 communicates with an opening 78 in the connector plate 61, which in turn is aligned with an opening 5 in the speaker cabinet 4. The socket stem passageway 67 has a socket stem longitudinal axis 77 that passes through the ends of the socket stem passageway 67 and is perpendicular to the connector plate socket facing surface 63. The socket stem passageway 67 has a width wsp that is greater than a height hsp of the socket stem passageway 67. In addition, the socket stem passageway 67 has a width wsp that is at least 60 percent of a width ws of the socket 70. As used herein, the socket stem passageway width wsp corresponds to a dimension in a direction transverse to both the socket stem longitudinal axis 77 and the connector plate longitudinal axis 66, and parallel to the socket free edge 76. The socket stem passageway height hsp corresponds to a dimension in a direction parallel to the connector plate longitudinal axis 66.

Referring to FIGS. 15-18, the bracket assembly 10 includes a clamp assembly 120 that is used to maintain the ball and socket joint 12 in an assembled configuration and to allow adjustment and securement of the relative positions of the ball 100 and socket 70. The clamp assembly 120 includes a cap 130 that overlies the socket outer surface 71, a pin 138 that is disposed in the ball through hole 102, and a fastener 122 that secures the cap 130 to the pin 138 while clamping the ball 100 and the socket 70 therebetween.

The cap 130 has the shape of a shallow bowl, and includes a spherical cap inward facing surface 131 that confronts the socket outer surface 71, and an opposed spherical cap outward facing surface 132. The cap 130 includes a through hole 133 that extends between the cap inward facing surface 131 and the cap outward facing surface 132. A hollow cylindrical boss 134 surrounds the cap through hole 133 and protrudes outward from the cap outward facing surface 132. In some embodiments, the cap inward facing surface 131 includes surface features that enhance engagement between the cap inward facing surface 131 and the socket outer surface 71. For example, the surface features may include protruding ribs 135, stipples (not shown), knurling (not shown) and/or other friction enhancing features (not shown).

The fastener 122 is an elongated bolt that includes a head 125, and a threaded shank 126 that extends from one side of the head 125. In use, the head 125 abuts the distal end of the cap boss 134, and the shank 126 passes through the cap through hole 133, the socket through hole 73 and extends into the pin 138 which is disposed in ball through hole 102. The exterior threads of the shank 126 engage the interior threads of the pin 138, whereby the cap 130 is secured to the pin 138, and the ball 100 and socket 70 is clamped between the cap 130 and the pin 138.

In the illustrated embodiment, the fastener head 125 is disposed within a recess 129 formed in the distal end of the cap boss 134, and a cap cover 136 is press fit into the recess 129 so as to overlie the head 125. As a result, the fastener head 125 is hidden from view whereby the likelihood of theft and/or tampering is reduced. Moreover, the cap cover 136 closes the end of the boss 134, whereby moisture entry into the ball and socket joint 12 via the cap 130 is minimized or prevented.

Figure 19:
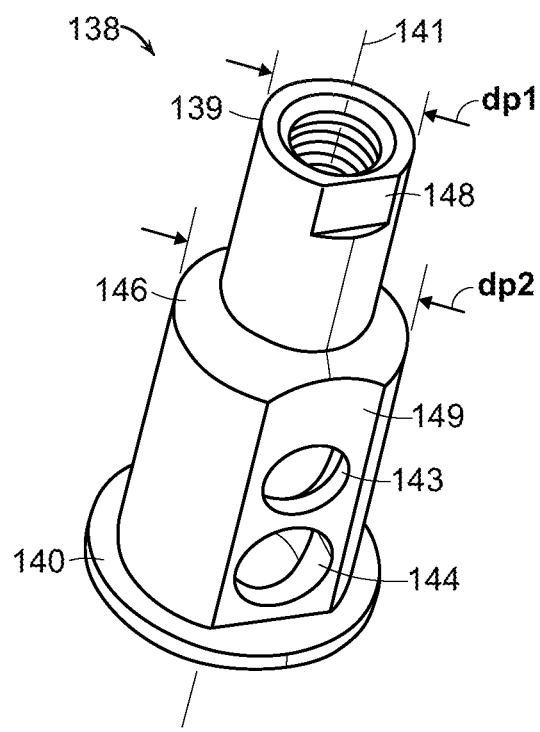
FIG. 19 is a top perspective view of the pin.
Figure 20:
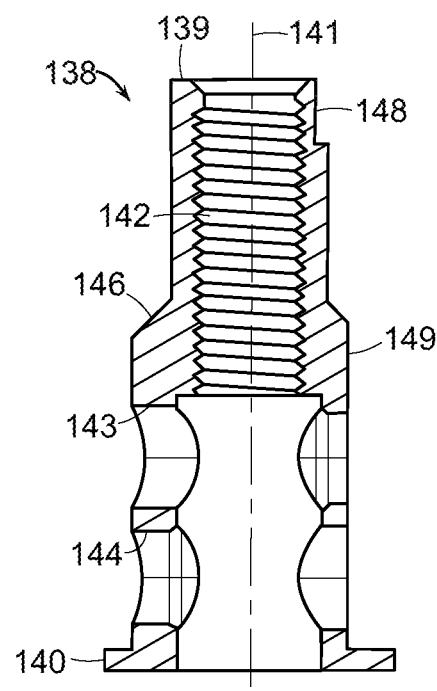
FIG. 20 is a cross sectional view of the pin.

Referring to FIGS. 10 and 19-20, the pin 138 is an elongate hollow tube that includes a pin first end 139 having a threaded inner surface 142, a pin second end 140 that is opposed to the first end 139, and a pin longitudinal axis 141 that extends through the pin first and second ends 139, 140. The pin first end 139 has a first pin diameter dp1 and the pin second end 140 has a second pin diameter dp2 that is larger than the first pin diameter dp1. In addition, the pin 138 includes an inclined pin shoulder 146 disposed between the pin first end 139 and the pin second end 140 at the transition between the first and second pin diameters dp1, dp2.

The pin 138 is disposed within the ball through hole 102 such that the pin first end 140 resides within the ball through hole first end 103, and the pin second end 140 resides within the ball through hole second end 104. The pin 138 is radially dimensioned to fit within the ball through hole 102 with the pin shoulder 146 abutting the ball shoulder 107. The pin 138 is longitudinally dimensioned such that the pin second end 140 terminates within the ball through hole 102, and the pin first end 139 protrudes out of the ball 100 and extends through the socket through hole 73 and at least a portion of the cap through hole 133, allowing the pin 138 to serve as a pivot axis for rotation of the socket 70 relative to the ball 100.

A pair of flats 148, 149 are formed in the outer surface of the pin 138. In particular, a pin first flat 148 is provided adjacent to the pin first end 139, and is configured to engage a corresponding cap flat 137 provided on a portion of the cap through hole 133. The engagement between the pin first flat 148 and the cap flat 137 prevents rotation of the cap 130 relative to the pin 138 and ball 100. In addition, a pin second flat 149 is provided between the pin shoulder 146 and the pin second end 140. The pin second flat 149 cooperates with the ball through hole flat 109 to rotationally locate the pin 138 within the ball through hole 102, and to prevent relative rotation between the pin 138 and the ball through hole 102, whereby the position and orientation of the pin 138 relative to the ball 100 is fixed.

The threads provided on the pin inner surface 142 are configured to engage the exterior threads formed on the fastener shank 126, whereby the pin 138 is mechanically connected to the cap 130. Moreover, tightening of the fastener 122 relative to the pin 138 causes the fastener 122 to cooperate with the pin 138 in such a way that the pin 138 shoulder is drawn against the ball shoulder 107 and thus urges the ball 100 against the socket inner surface 72 and the fastener head 125 is drawn against the cap outer ward facing surface 132 whereby the socket 70 is clamped between the ball 100 and the cap 130, and the position of the socket 70 is fixed relative to the position of the ball 100.

The pin 138 includes a first pin passageway 143 and a second pin passageway 144 that are perpendicular to the pin longitudinal axis 141 and extend diametrically through the pin 138 between the pin shoulder 146 and the pin second end 140. The first and second pin passageways 143, 144 are parallel to each other and each intersects the hollow interior space of the pin 138. In addition, the first and second pin passageways 143, 144 each intersect the second pin flat 149. The first pin passageway 143 is aligned with the second ball passageway 106, and the second pin passageway 144 is aligned with the first ball passageway 105.

Referring again to FIG. 3, the wiring harness 230 has a first end 231 that is electrically connected to the terminals 220 provided on the outer bracket 40, and a second end 232 that is disposed within the speaker cabinet 4 and electrically connected to the speaker(s) 6. The wiring harness 230 passes within the interior of the bracket assembly 10 so that it is hidden from view. In particular, the wire harness 230 passes through the second wiring through hole 47 in the outer endwall 42 and the first ball passageway 105. Within the ball 100, the wire harness 230 passes through the second pin passageway 144, the pin interior space where it exits the second pin passageway and enters the first pin passageway 143, and passes through the second ball passageway 106. After exiting the ball 100, the wire harness 230 passes through the socket stem passageway 67, and the opening 5 in the speaker cabinet 4. The wire harness 230 is electrically connected to the speakers within the speaker cabinet 4.

In the illustrated embodiment, the pin second end 140 is recessed within the ball through hole 102 adjacent to the ball second end 104, and a pin cover 147 is press fit into the ball through hole 102 at this location. In some embodiments, the pin cover 147 is formed of silicon. The pin cover 147 hides the pin second end 140 from view and closes the ball second end 104, whereby moisture entry into the ball and socket joint 12 via the ball through hole 102 or pin 138 is minimized or prevented.

Figure 21:
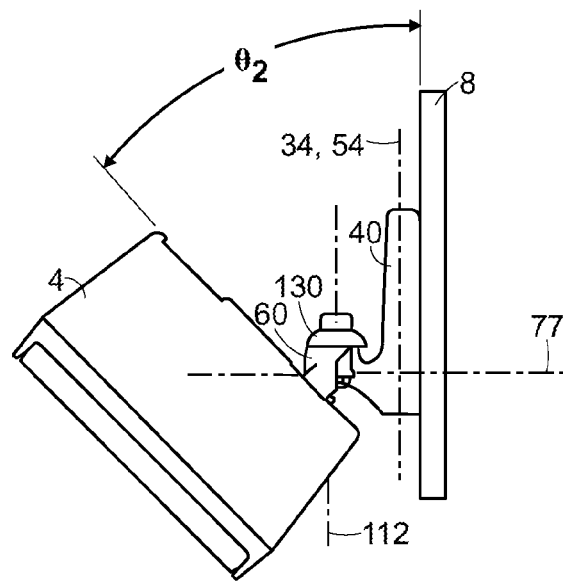
FIG. 21 is a side view of the audio speaker device of FIG. 1 illustrating a device orientation that is angled approximately 45 degrees downward relative to the horizontal.
Figure 22:
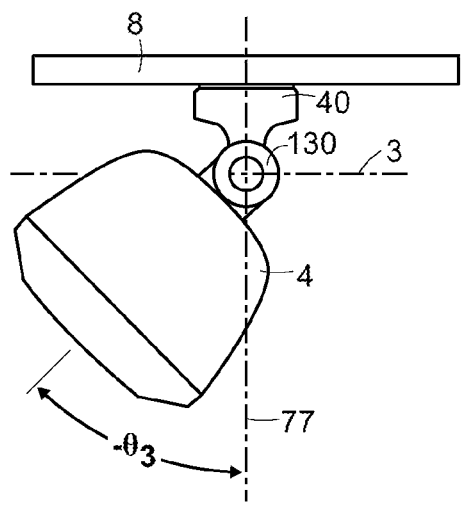
FIG. 22 is a top view of the audio speaker device of FIG. 1 illustrating a device orientation that is angled approximately (plus) 45 degrees laterally relative to the vertical.
Figure 23:
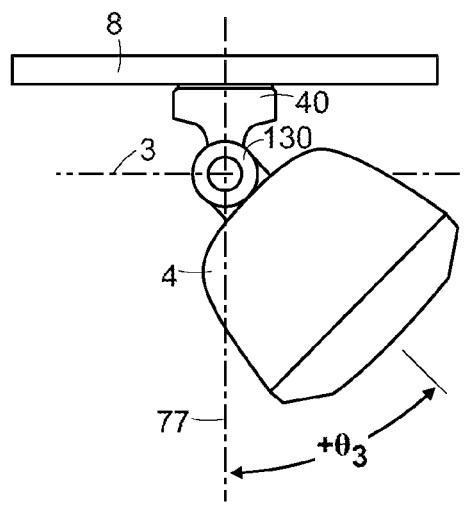
FIG. 23 is a top view of the audio speaker device of FIG. 1 illustrating a device orientation that is angled approximately (minus) 45 degrees laterally relative to the vertical.

Referring to FIGS. 21-23, in use, the angular orientation of the socket 70 relative to the ball 100 is adjusted by removing the cap cover 136 and loosening the fastener 122 to an extent that the clamping force applied by the clamping assembly 120 is relieved, and the socket 70 is rotatable relative to the ball 100. When the clamping force applied by the clamping assembly 120 is relieved, the ball and socket joint 12 is rotatable about the ball longitudinal axis 112 through an angle θ3 of plus or minus 45 degrees relative to the socket stem longitudinal axis 77. In addition, the ball and socket joint 12 is rotatable about a reference axis 3 through an angle of plus 45 degrees relative to the socket stem longitudinal axis 77. The reference axis 3 is orthogonal to both the ball longitudinal axis 112 and the socket stem longitudinal axis 77. When audio speaker device 2 is mounted on a wall, the angle θ2 corresponds to adjustment in the vertical direction and the angle θ3 corresponds to adjustment in the horizontal direction.

Referring to FIGS. 5-6 and 10, the bracket assembly 10 includes strategically placed seals 150, 152, 154, 156 that prevent moisture from entering the speaker cabinet 4 and the interior space defined between the inner and outer brackets 20, 40. In particular, a first seal 150 is disposed in the second wiring through hole 47, which is formed in the outer endwall 41. The first seal 150 may be, for example, a cylindrical wiring harness seal that includes axially-spaced circumferentially extending ribs formed in an outer surface thereof. The first seal 150 is shaped and dimensioned to plug a gap between wire harness 230 and the second wiring through hole 47, thus preventing moisture that infiltrates the ball and socket joint 12 from entering into the space between the inner bracket 20 and the outer bracket 40.

A second seal 152 in the form of a thin sheet of sealing material overlies the inner endwall outward facing surface 23. The second seal 152 prevents moisture from entering into the space between the inner bracket 20 and the outer bracket 40 via gaps between the inner and outer sidewalls 28, 48 or openings in the inner endwall 28 that permit passage of wires, fasteners, etc.

A third seal 154 is a rectangular frame shaped gasket. The third seal 154 is shaped and dimensioned to be press fit into the channel 165 that is formed in the inner endwall ramp free edge 164. The third seal 154 abuts, and is compressed between, the free edges of both the inner and outer endwall ramps 160, 170. In this configuration, the third seal 154 surrounds the inner space defined between the ramps 160, 170 that includes the electrical connectors 210, 220.

In addition, a fourth seal 156 is disposed within the speaker wire opening 5 of the speaker cabinet 4. Like the first seal 150, the fourth seal 156 is a cylindrical wiring harness seal that includes axially-spaced circumferentially extending ribs formed in an outer surface thereof. The fourth seal 156 is shaped and dimensioned to plug a gap between the wire harness 230 and the cabinet wire opening 5, thus preventing moisture that enters the ball and socket joint 12 from entering speaker cabinet via the socket stem 64.

Although the bracket assembly 10 is described herein as supporting a speaker cabinet 4 as part of an audio speaker device 2, the bracket assembly 10 can be used to support other devices such as monitors, score boards, fans, etc., and has particular benefit for supporting devices having electrical wires that can be hidden within the bracket assembly 10.

A selective illustrative embodiment of the device is described above in some detail. It should be understood that only structures considered necessary for clarifying the device have been described herein. Other conventional structures, and those of ancillary and auxiliary components of the device, are assumed to be known and understood by those skilled in the art. Moreover, while a working example of the device has been described above, the device is not limited to the working example described above, but various design alterations may be carried out without departing from the device as set forth in the claims.

We claim:

1. A bracket assembly for connecting a housing to a support structure, the bracket assembly comprising an outer bracket, and an inner bracket that secures the outer bracket to the support structure,
    the outer bracket including
        an outer endwall having an inward facing surface, an outward facing surface, and a connector that protrudes from the outward facing surface,
        an outer sidewall that surrounds the outer endwall and protrudes from a peripheral edge of the outer endwall in a direction normal to the outer endwall inward facing surface, the outer sidewall including a tab that protrudes from an inward facing surface of the outer sidewall,
    the inner bracket including
        an inner endwall having an inward facing surface and an outward facing surface,
        an inner sidewall that surrounds the inner endwall and protrudes from a peripheral edge of the inner endwall in a direction normal to the inner endwall inward facing surface, the inner sidewall including a groove formed in an outward facing surface of the inner sidewall, the groove having non-uniform groove width,
    wherein
        the inner bracket is disposed within the outer bracket such that
            the inward facing surface of the outer sidewall faces the outward facing surface of the inner sidewall,
            the tab is disposed in, and engaged with, the groove, and
            the inner sidewall is disposed between the outer endwall and the inner endwall.

2. The bracket assembly of claim 1, wherein
    the outer sidewall has a first edge that adjoins the outer endwall, and a second edge that is parallel to and spaced apart from the first edge,
    the tab protrudes from the outer sidewall inward facing surface and is elongated in a direction that is perpendicular to the outer endwall inward facing surface,
    the tab has a leading edge that is flush with the outer sidewall second edge, and a trailing edge that is spaced apart from the outer sidewall first edge.

3. The bracket assembly of claim 1, wherein
    an outer endwall ramp is provided on the inward facing surface of the outer endwall and includes a first inclined surface,
    an inner endwall ramp is provided on the inward facing surface of the outer endwall and includes a second inclined surface, and
    the first inclined surface and the second inclined surface are engaged in such a way that the tab is urged against a surface of the groove.

4. The bracket assembly device of claim 1, wherein
    the inner sidewall has a first edge that adjoins the inner endwall, and a second edge that is parallel to and spaced apart from the first edge,
    the groove has a first portion and a second portion, an intersection of the groove first portion with the inner sidewall second edge defining a groove opening, the groove first portion having a first groove width and extending toward the inner sidewall first edge, the groove second portion being in communication with the groove first portion and being spaced apart from the inner sidewall second edge, the groove second portion having a second groove width that is greater than the first groove width, where the groove width is a dimension of the groove in a direction parallel to the first edge.

5. The bracket assembly of claim 4, wherein the groove includes a groove shoulder at the transition between the first groove portion and the second groove portion, and the tab is disposed in the second groove portion and confronts the groove shoulder when the inner bracket is assembled with the outer bracket.

6. The bracket assembly of claim 1, wherein
    the inner endwall includes
        an inner endwall first end,
        an inner endwall second end that is parallel to and spaced apart from the inner endwall first end,
        an inner endwall ramp that is spaced apart from the inner sidewall and protrudes from the inward facing surface of the inner endwall, the inner endwall ramp extending along a line that is perpendicular to the inner endwall first end, the inner endwall ramp having a first ramp height at a first end of the inner endwall ramp, the inner endwall ramp having a second ramp height at a second end of the inner endwall ramp, where the first end of the inner endwall ramp is disposed between the inner endwall first end and the second end of the inner endwall ramp, and the first ramp height is less than the second ramp height, and the outer endwall includes
- an outer endwall first end,
- an outer endwall second end that is parallel to and spaced apart from the outer endwall first end,
- an outer endwall ramp that is spaced apart from the outer sidewall and protrudes from the inward facing surface of the outer endwall, the outer endwall ramp extending along a line that is perpendicular to the outer endwall first end, the outer endwall ramp having a third ramp height at a first end of the outer endwall ramp, the outer endwall ramp having a fourth ramp height at a second end of the outer endwall ramp, where the first end of the outer endwall ramp is disposed between the outer endwall first end and the second end of the outer endwall ramp, and the fourth ramp height is less than the third ramp height.

7. The bracket assembly of claim 6, wherein
the inner endwall ramp includes a free edge, and
the free edge is formed having a channel that is configured to receive a gasket.

8. The bracket assembly of claim 1, wherein
the outer bracket includes an outer bracket electrical terminal,
the inner bracket includes an inner bracket electrical terminal, and
the outer bracket electrical terminal and the inner bracket electrical terminal are configured to automatically engage upon engagement of the tab with the groove.

9. The bracket assembly of claim 1 wherein the connector is a ball joint.

10. An audio speaker device, comprising
a speaker cabinet, and
a bracket assembly that is secured to the speaker cabinet and is configured to connect the speaker cabinet to a support structure, the bracket assembly including an outer bracket, and an inner bracket that secures the outer bracket to the support structure,
the outer bracket including
- an outer endwall having an inward facing surface, an outward facing surface, and a connector that protrudes from the outward facing surface,
- an outer sidewall that surrounds the outer endwall and protrudes from a peripheral edge of the outer endwall in a direction normal to the outer endwall inward facing surface, the outer sidewall including a tab that protrudes from an inward facing surface of the outer sidewall, the inner bracket including
- an inner endwall having an inward facing surface and an outward facing surface,
- an inner sidewall that surrounds the inner endwall and protrudes from a peripheral edge of the inner endwall in a direction normal to the inner endwall inward facing surface, the inner sidewall including a groove formed in an outward facing surface of the inner sidewall, the groove having non-uniform groove width, wherein
the inner bracket is disposed within the outer bracket such that
- the inward facing surface of the outer sidewall faces the outward facing surface of the inner sidewall,
- the tab is disposed in, and engaged with, the groove, and
- the inner sidewall is disposed between the outer endwall and the inner endwall.

11. The audio speaker device of claim 10, wherein
the outer sidewall has a first edge that adjoins the outer endwall, and a second edge that is parallel to and spaced apart from the first edge,
the tab protrudes from the outer sidewall inward facing surface and is elongated in a direction that is perpendicular to the outer endwall inward facing surface,
the tab has a leading edge that is flush with the outer sidewall second edge, and a trailing edge that is spaced apart from the outer sidewall first edge.

12. The audio speaker device of claim 10, wherein
an outer endwall ramp is provided on the inward facing surface of the outer endwall and includes a first inclined surface,
an inner endwall ramp is provided on the inward facing surface of the outer endwall and includes a second inclined surface, and
the first inclined surface and the second inclined surface are engaged in such a way that the tab is urged against a surface of the groove.

13. The audio speaker device of claim 10, wherein
the inner sidewall has a first edge that adjoins the inner endwall, and a second edge that is parallel to and spaced apart from the first edge,
the groove has a first portion and a second portion, an intersection of the groove first portion with the inner sidewall second edge defining a groove opening, the groove first portion having a first groove width and extending toward the inner sidewall first edge, the groove second portion being in communication with the groove first portion and being spaced apart from the inner sidewall second edge, the groove second portion having a second groove width that is greater than the first groove width, where the groove width is a dimension of the groove in a direction parallel to the first edge.

14. The audio speaker device of claim 10, wherein the groove includes a groove shoulder at the transition between the first groove portion and the second groove portion, and the tab is disposed in the second groove portion and confronts the groove shoulder when the inner bracket is assembled with the outer bracket.

15. The audio speaker device of claim 10, wherein
the inner endwall includes
- an inner endwall first end,
- an inner endwall second end that is parallel to and spaced apart from the inner endwall first end, and
- an inner endwall ramp that is spaced apart from the inner sidewall and protrudes from the inward facing surface of the inner endwall, the inner endwall ramp extending along a line that is perpendicular to the inner endwall first end, the inner endwall ramp having a first ramp height at a first end of the inner endwall ramp, the inner endwall ramp having a second ramp height at a second end of the inner endwall ramp, where the first end of the inner endwall ramp is disposed between the inner endwall first end and the second end of the inner endwall ramp, and the first ramp height is less than the second ramp height, and the outer endwall includes
an outer endwall first end,
an outer endwall second end that is parallel to and spaced apart from the outer endwall first end, and
an outer endwall ramp that is spaced apart from the outer sidewall and protrudes from the inward facing surface of the outer endwall, the outer endwall ramp extending along a line that is perpendicular to the outer endwall first end, the outer endwall ramp having a third ramp height at a first end of the outer endwall ramp, the outer endwall ramp having a fourth ramp height at a second end of the outer endwall ramp, where the first end of the outer endwall ramp is disposed between the outer endwall first end and the second end of the outer endwall ramp, and the fourth ramp height is less than the third ramp height.

16. The audio speaker device of claim 15, wherein
the inner endwall ramp includes a free edge, and
the free edge is formed having a channel that is configured to receive a gasket.

17. The audio speaker device of claim 15, wherein
the inner endwall ramp and the outer endwall ramp each have the appearance of a rectangular frame when viewed in a direction perpendicular to the inner endwall inward facing surface.

18. The audio speaker device of claim 10, wherein
the outer bracket includes an outer bracket electrical terminal,
the inner bracket includes an inner bracket electrical terminal, and
the outer bracket electrical terminal and the inner bracket electrical terminal are configured to automatically engage upon engagement of the tab with the groove.

19. The audio speaker device of claim 10 wherein the connector is a ball joint.

* * * * *